(12) United States Patent
Su

(10) Patent No.: US 12,361,566 B2
(45) Date of Patent: Jul. 15, 2025

(54) METHOD AND APPARATUS FOR EVALUATING MOTION STATE OF TRAFFIC TOOL, DEVICE, AND MEDIUM

(71) Applicant: Tencent Technology (Shenzhen) Company Limited, Shenzhen (CN)

(72) Inventor: Jinglan Su, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 351 days.

(21) Appl. No.: 17/978,113

(22) Filed: Oct. 31, 2022

(65) Prior Publication Data
US 2023/0053952 A1   Feb. 23, 2023

Related U.S. Application Data

(63) Continuation of application No. PCT/CN2022/072436, filed on Jan. 18, 2022.

(30) Foreign Application Priority Data

Jan. 25, 2021   (CN) .......................... 202110100057.9

(51) Int. Cl.
*G06T 7/246*   (2017.01)
*G01C 21/32*   (2006.01)
(Continued)

(52) U.S. Cl.
CPC .............. *G06T 7/248* (2017.01); *G01C 21/32* (2013.01); *G06T 5/50* (2013.01); *G06T 5/70* (2024.01);
(Continued)

(58) Field of Classification Search
CPC .. G06T 7/248; G06T 5/50; G06T 5/70; G06T 7/251; G06T 2207/20021;
(Continued)

(56) References Cited

U.S. PATENT DOCUMENTS

2007/0031062 A1   2/2007   Pal et al.
2014/0005877 A1*  1/2014   Xu ........................ G06F 17/00
                                                  701/29.1

(Continued)

FOREIGN PATENT DOCUMENTS

CN   105513094 A   4/2016
CN   107123128 A   9/2017
(Continued)

OTHER PUBLICATIONS

M. Fisher et al., "An algorithm for the construction of intrinsic delaunay triangulations with applications to digital geometry processing" (Year: 2007).*

(Continued)

*Primary Examiner* — Mekonen T Bekele
(74) *Attorney, Agent, or Firm* — Banner & Witcoff, Ltd.

(57) ABSTRACT

This application provides a method for evaluating a motion state of a vehicle performed by a computer device. The method includes: obtaining target image data captured by cameras on the vehicle, and combining every two neighboring image frames in the target image data into N image frame groups; obtaining matching feature points between two image frames included in each of the N image frame groups; constructing target mesh plane figures respectively corresponding to the N image frame groups according to the matching feature points in each image frame group; and determining the motion state of the vehicle according to the target mesh plane figures respectively corresponding to the N image frame groups. By adopting the embodiments of this application, the evaluation accuracy of the motion state of the vehicle may be improved.

20 Claims, 15 Drawing Sheets

(51) Int. Cl.
*G06T 5/50* (2006.01)
*G06T 5/70* (2024.01)

(52) U.S. Cl.
CPC .... *G06T 7/251* (2017.01); *G06T 2207/20021* (2013.01); *G06T 2207/20212* (2013.01); *G06T 2207/30252* (2013.01)

(58) Field of Classification Search
CPC . G06T 2207/20212; G06T 2207/30252; G06T 7/246; G06T 7/13; G01C 21/32; G01C 11/06; G06Q 10/06393
See application file for complete search history.

(56) References Cited

U.S. PATENT DOCUMENTS

| | | |
|---|---|---|
| 2014/0334668 A1 | 11/2014 | Saund |
| 2014/0336848 A1 | 11/2014 | Saund et al. |
| 2015/0213617 A1* | 7/2015 | Kim ..................... H04N 23/57 382/103 |
| 2016/0379375 A1 | 12/2016 | Lu et al. |
| 2017/0277197 A1 | 9/2017 | Liao et al. |
| 2018/0190016 A1 | 7/2018 | Yang |

FOREIGN PATENT DOCUMENTS

| | | | | |
|---|---|---|---|---|
| CN | 109146972 A | * | 1/2019 | ........... G06K 9/4609 |
| CN | 110111375 A | | 8/2019 | |
| CN | 110458747 A | | 11/2019 | |
| CN | 110705568 A | | 1/2020 | |
| CN | 111736188 A | | 10/2020 | |
| CN | 112255648 A | | 1/2021 | |
| CN | 112734290 A | | 4/2021 | |
| CN | 109146972 B | * | 4/2022 | ........... G06K 9/4609 |
| KR | 20150088636 | | 8/2015 | |

OTHER PUBLICATIONS

Tencent Technology, Extended European Search Report, EP Patent Application No. 22742131.0, May 23, 2024, 18 pgs.
Petr Broz et al., "Dynamic Path Planning with Regular Triangulations", Machine Graphics and Vision, vol. 23, No. 3/4, DOI: 10 22630/MGV.2014.23.3.6, Dec. 2014, 24 pgs.
Tencent Technology, WO, PCT/CN2022/072436, Apr. 7, 2022, 5 pgs.
Tencent Technology, IPRP, PCT/CN2022/072436, Jul. 20, 2023, 6 pgs.
Tencent Technology, ISR, PCT/CN2022/072436, Apr. 7, 2022, 3 pgs.

* cited by examiner

METHOD AND APPARATUS FOR EVALUATING MOTION STATE OF TRAFFIC TOOL, DEVICE, AND MEDIUM

CROSS-REFERENCE TO RELATED APPLICATIONS

This application is a continuation application of PCT Patent Application No. PCT/CN2022/072436, entitled "VEHICLE MOTION STATE EVALUATION METHOD AND APPARATUS, DEVICE, AND MEDIUM" filed on Jan. 18, 2022, which claims priority to Chinese Patent Application No. 202110100057.9, filed with the State Intellectual Property Office of the People's Republic of China on Jan. 25, 2021, and entitled "METHOD AND APPARATUS FOR EVALUATING MOTION STATE OF TRAFFIC TOOL, DEVICE, AND MEDIUM", all of which are incorporated herein by reference in their entirety.

FIELD OF THE TECHNOLOGY

This application relates to the field of Internet technologies, and in particular, to a method and apparatus for evaluating a motion state of a vehicle, a device, and a medium.

BACKGROUND OF THE DISCLOSURE

A motion state of a vehicle serves as a condition for validity detection of an active safety system of the vehicle, positioning and navigation of the vehicle, and an alarm of the vehicle. Therefore, an evaluation process of the motion state of the vehicle becomes a widely studied topic. In the related art, the motion state of the vehicle may be generally determined through satellite positioning or an inertial sensor, and positioning and navigation of the vehicle may be effectively assisted based on a determination result of the motion state of the vehicle.

However, when the vehicle is in a special environment (for example, an urban canyon formed by tall buildings or a positioning blind zone formed by flyovers) of a modern city, a position positioned by a satellite and an actual position of the vehicle may have an error, and the accuracy of the motion state of the vehicle may be excessively low due to a position error of satellite positioning and a performance error of the inertial sensor.

SUMMARY

In view of this, embodiments of this application provide a method and apparatus for evaluating a motion state of a vehicle, a device, and a medium, so that the evaluation accuracy of the motion state of the vehicle may be improved.

An aspect of the embodiments of this application provides a method for evaluating a motion state of a vehicle, performed by a computer device and including:
  obtaining target image data captured by cameras on the vehicle, and combining every two neighboring image frames in the target image data into N image frame groups, N being a positive integer;
  obtaining matching feature points between two image frames included in each image frame group in the N image frame groups;
  constructing target mesh plane figures respectively corresponding to the N image frame groups according to the matching feature points in each image frame group; and
  determining the motion state of the vehicle according to the target mesh plane figures respectively corresponding to the N image frame groups.

An aspect of the embodiments of this application provides an apparatus for evaluating a motion state of a vehicle, including:
  a first obtaining module, configured to obtain target image data captured by cameras on the vehicle, and combining every two neighboring image frames in the target image data into N image frame groups, N being a positive integer;
  a second obtaining module, configured to obtain matching feature points between two image frames included in each image frame group in the N image frame groups;
  a mesh figure construction module, configured to construct target mesh plane figures respectively corresponding to the N image frame groups according to the matching feature points in each image frame group; and
  a motion state determining module, configured to determine the motion state of the vehicle according to the target mesh plane figures respectively corresponding to the N image frame groups.

An aspect of the embodiments of this application provides a computer device, including a memory and a processor, the memory being connected to the processor, the memory being configured to store a computer program, and the processor being configured to invoke the computer program and causing the computer device to perform the method provided in the foregoing aspects of the embodiments of this application.

An aspect of the embodiments of this application provides a non-transitory computer-readable storage medium, storing a computer program, the computer program, adapted to be loaded and executed by a processor of a computer device and causing the computer device to perform the method provided in the foregoing aspects of the embodiments of this application.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to perform the method provided in the foregoing aspects.

According to the embodiments of this application, target image data corresponding to a vehicle may be obtained, every two neighboring image frames in the target image data are combined to obtain N image frame groups, matching feature points between two image frames included in each image frame group in the N image frame groups may be further obtained, and target mesh plane figures respectively corresponding to the N image frame groups are constructed according to the matching feature points in each image frame group; and a motion state of the vehicle is determined according to the target mesh plane figures respectively corresponding to the N image frame groups. As can be seen, the target image data corresponding to the vehicle is obtained, the matching feature points between two adjacent image frames are extracted, the target mesh plane figure corresponding to the two adjacent image frames is constructed according to the matching feature points between the two adjacent image frames, and the motion state of the vehicle may be accurately evaluated based on the target mesh plane figure, so that the evaluation accuracy of the motion state of the vehicle may be improved.

DESCRIPTION OF EMBODIMENTS

Figure 1:
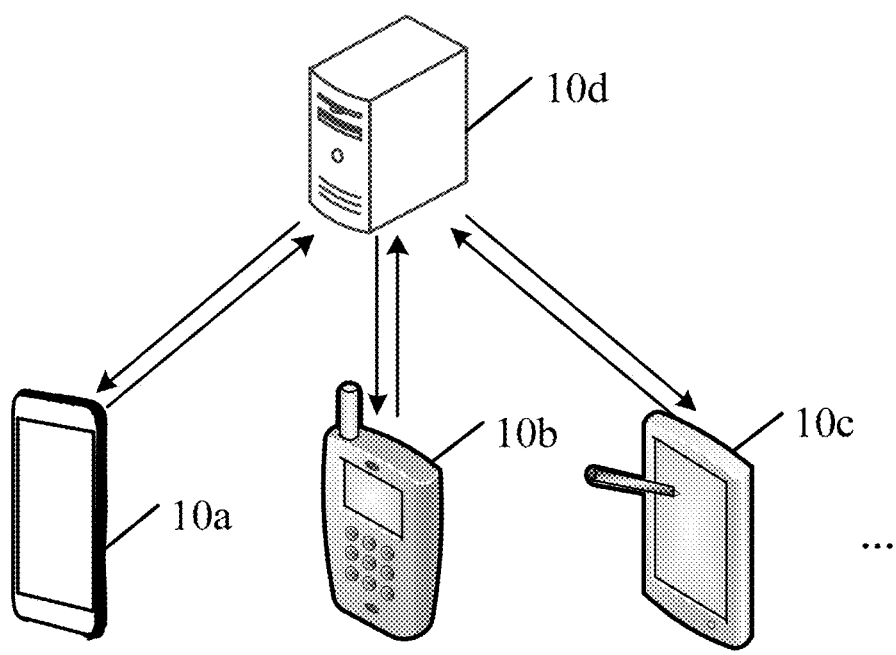
FIG. 1 is a schematic structural diagram of a network architecture according to an embodiment of this application.

The technical solutions in the embodiments of this application are clearly and completely described below with reference to the accompanying drawings in the embodiments of this application. Apparently, the described embodiments are merely some embodiments of this application rather than all of the embodiments. All other embodiments obtained by a person of ordinary skill in the art based on the embodiments of this application without making creative efforts shall fall within the protection scope of this application.

The embodiments of this application involve the following concepts:

Location-based service (LBS): LBS is a location-related service provided by a wireless carrier for a user. The LBS obtains a current position of a positioning device through various types of positioning technologies, and provide information resources and basic services to the positioning device through the mobile Internet. The LBS integrates a plurality of information technologies such as mobile communication, interconnection network, space positioning, location information, and big data, and performs data updating and exchange through a mobile interconnection network service platform, so that the user may obtain a corresponding service through space positioning.

In-vehicle image data may be data provided by an in-vehicle camera, and the in-vehicle camera is a basis for implementing various pre-warning, and recognition-type advanced driving assistance system (ADAS) functions. In most ADAS functions, a visual image processing system is a basic function in ADAS functions, and a camera may serve as an input of the visual image processing system, so that the in-vehicle camera is essential for smart driving. In-vehicle cameras of a vehicle may include a built-in camera, a surround view camera, a side view camera, a reverse rear view camera, a front view sensor camera, and a driving recorder camera. A type of the front view sensor camera may include a monocular camera and a binocular camera. Different from the monocular camera, the binocular camera has a better ranging function, but the binocular camera needs to be installed at two different positions, so that the binocular camera costs 50% more than the monocular camera. A type of the surround view camera may be a wide-angle lens, 4 surround view cameras may be assembled surrounding the vehicle, and images photographed by the 4 surround view cameras are spliced to implement a panoramic image, where road line sensing may be implemented by using an algorithm according to the panoramic image. The rear view camera may be a wide-angle lens or a fisheye lens, which is mainly used during reversing. The in-vehicle cameras of the vehicle are mainly applicable to reversing image (photographed by the rear view camera) and 360-degree panoramic image (photographed by the surround view cameras) scenarios in the vehicle. Up to 8 cameras may be configured for various assistance devices of a high-end vehicle, which are configured to assist a driver in parking or triggering emergency braking. When the in-vehicle cameras successfully replace side mirrors, the number of cameras on the vehicle may reach 12, and with the development of unmanned driving technologies, a requirement of a smart driving vehicle type on cameras may also increase. In the embodiments of this application, this application may use image data acquired by a front view sensor camera or a driving recorder camera to assist a satellite positioning device.

An image feature point refers to a point whose image grayscale value changes drastically or a point having a relatively great curvature on an edge of an image (namely, an intersection point of two edges). During image processing, the image feature point has a quite important function in a feature point-based image matching algorithm. The image feature point can reflect an essential feature of an image, and a target object in the image may be identified, so that image matching can be completed through feature point matching. The image feature point mainly includes two parts: a key point and a descriptor. The key point refers to a position of a feature point in an image, and sometimes may further include information such as a direction and a scale; and the descriptor may refer to a vector, and the descriptor may be manually designed to describe relationship information of the key point with surrounding pixels. Generally, according to a principle that features with similar appearance are to have similar descriptors, during feature point matching performed on involved feature points, if a distance (for example, a Mahalanobis distance or a Hamming distance) between descriptors of two feature points in a vector space is close, it may be considered that the two feature points are the same feature point.

A Delaunay triangulation network may refer to a set of series of connected but non-overlapping triangles, and a circumscribed circle of each triangle in the Delaunay triangulation network does not include any other point other than vertexes of the triangle. The Delaunay triangulation network may include features such as a good structure, a simple data structure, small data redundancy, high storage efficiency, and being harmony and consistent with irregular ground features. The Delaunay triangulation network may represent a region boundary of a linear feature on which any shape is superimposed, which is easy to update and may adapt to data of various distribution densities. The Delaunay triangulation network includes two specific properties, which are as follows:

1. An empty circumscribed circle property of the Delaunay triangulation network: The Delaunay triangulation network is unique (any four points cannot be concyclic), a circumscribed circle of each triangle in the Delaunay triangulation network does not include any other point in a Delaunay triangulation network plane, and the property may be used as a discrimination standard for creation of a Delaunay triangulation network; and 2. A largest minimum angle property: in triangulations that may be formed by scattered point sets, a minimum angle of a triangle formed by a Delaunay triangulation is the largest. In other words, a minimum angle of six internal angles is no longer increased after diagonal lines of a convex quadrilateral formed by every two adjacent triangles in the Delaunay triangulation network are interchanged.

Referring to FIG. 1, FIG. 1 is a schematic structural diagram of a network architecture according to an embodiment of this application. As shown in FIG. 1, the network architecture may include a server 10d and a user terminal cluster. The user terminal cluster may include one or more user terminals, and the number of the user terminals is not limited herein. As shown in FIG. 1, the user terminal cluster specifically may include a user terminal 10a, a user terminal 10b, and a user terminal 10c. The server 10d may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The user terminal 10a, the user terminal 10b, and the user terminal 10c may each include: a smartphone, a tablet computer, a notebook computer, a palmtop computer, a mobile Internet device (MID), a wearable device (for example, a smart watch or a smart bracelet), and a mobile terminal including an image processing function and a positioning function such as an in-vehicle terminal in an automatic driving system. As shown in FIG. 1, the user terminal 10a, the user terminal 10b, and the user terminal 10c may each establish a network connection to the service server 10d, so that each user terminal can exchange data with the service server 10d through the network connection.

The user terminal 10a is used as an example, the user terminal 10a may be a terminal device in a vehicle, and the user terminal 10a may obtain image data photographed by a camera (for example, a front view camera or a driving recorder camera), where the image data may be a series of consecutive image frames (for example, N+1 image frames, N is a positive integer, and N may be 1, 2, 3, . . . ), or the image data may be photographed video data. When the image data is video data, the user terminal 10a may perform framing on the image data to obtain N+1 image frames. The user terminal 10a may perform feature point extraction on the N+1 image frames, further match image feature points in every two adjacent image frames to obtain matching feature points between every two adjacent image frames, construct a mesh plane figure (for example, a Delaunay triangulation network) corresponding to every two adjacent image frames according to the matching feature points, and further evaluate a motion state of the vehicle according to the mesh plane figure, where the motion state may be used for assisting a satellite positioning device. Certainly, the user terminal 10a may also transmit the N+1 image frames to the server 10d, for the server 10d to perform feature point extraction on the N+1 image frames, match image feature points in every two adjacent image frames to obtain matching feature points between every two adjacent image frames, and construct a mesh plane figure corresponding to every two adjacent image frames according to the matching feature points. A motion state of the vehicle evaluated based on the mesh plane figure may be returned to the user terminal 10a, and the user terminal 10a may provide an assistance foundation for the satellite positioning device of the vehicle according to the motion state of the vehicle.

Figure 2:
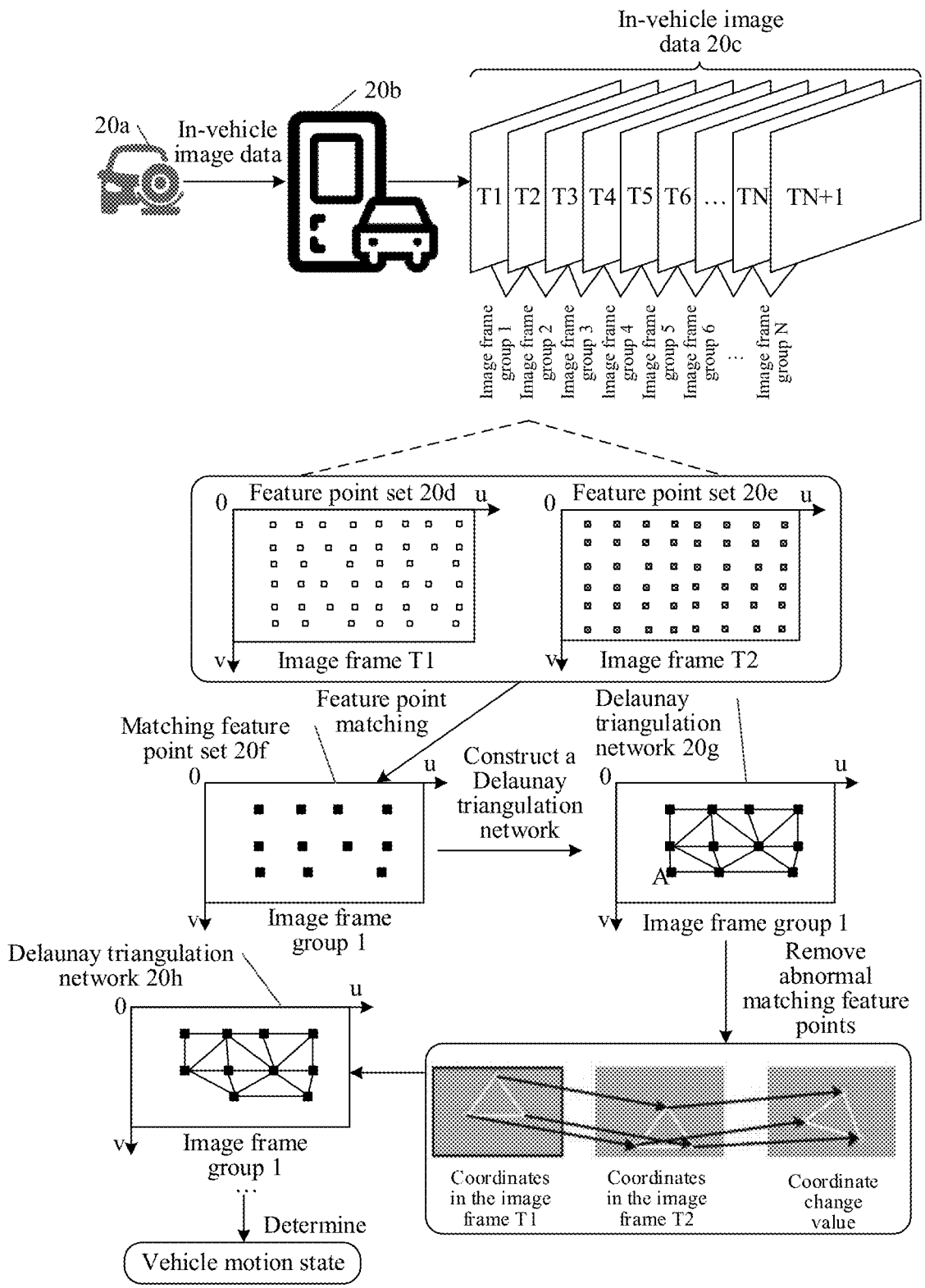
FIG. 2 is a diagram of a scenario of evaluating a motion state of a vehicle according to an embodiment of this application.

Referring to FIG. 2 together, FIG. 2 is a diagram of a scenario of evaluating a motion state of a vehicle according to an embodiment of this application. The vehicle being a driving vehicle is used as an example to describe an evaluation process of a motion state of the vehicle. As shown in FIG. 2, the driving vehicle may be configured with one or more in-vehicle cameras (for example, a driving recorder camera and a front view sensor camera), and the number of the in-vehicle cameras is not limited in the embodiments of this application. The driving vehicle may be further configured with an in-vehicle terminal 20b, and the in-vehicle camera 20a may acquire in-vehicle image data 20c corresponding to the driving vehicle and transmit the acquired in-vehicle image data 20c to the in-vehicle terminal 20b through a data cable or a wireless local area network. After the in-vehicle image data 20c (in this case, the in-vehicle image data 20c may be video data) transmitted by the in-vehicle camera 20a is obtained, the in-vehicle terminal 20b performs framing on the in-vehicle image data 20c to obtain N+1 image frames corresponding to the in-vehicle image data 20c, where N is a positive integer, and the N+1 image frames may be represented according to a time sequence of the in-vehicle image data 20c as: an image frame T1, an image frame T2, an image frame T3, . . . , and an image frame TN+1. Every two neighboring image frames in the N+1 image frames are combined to obtain N image frame groups, for example, the image frame T1 and the image frame T2 may form an image frame group 1, the image frame T2 and the image frame T3 may form an image frame group 2, . . . , and an image frame TN and the image frame TN+1 may form an image frame group N. For any image frame group in the N image frame groups, matching feature points between two image frames included in the image frame group may be obtained, Delaunay triangulation networks respectively corresponding to the N image frame groups may be constructed according to the matching feature points in each image frame group, and the motion state of the driving vehicle may be further determined according to the Delaunay triangulation networks respectively corresponding to the N image frame groups. Processing process on each image frame group in the N image frame groups is the same, and the following describes the processing process on each image frame group in detail by using the image frame group 1 as an example.

The in-vehicle terminal 20b may perform feature point extraction on the image frame T1 and the image frame T2 included in the image frame group 1. Points whose image grayscale values change drastically or points having a relatively great curvature on an edge of an image (namely, intersection points of two edges) are extracted from the image frame T1 through a feature extraction algorithm, and the extracted image points are determined as a feature point set 20d corresponding to the image frame T1. Similarly, a feature point set 20e may be extracted from the image frame T2 through the same feature extraction algorithm. An image coordinate system may be established in both the image frame T1 and the image frame T2, where the image coordinate system includes an axis U and an axis V, a coordinate on the axis U may be used for representing a column of a feature point in the image frame, and a coordinate on the axis V may be used for representing a row of the feature point in the image frame. As shown in FIG. 2, positions of feature points included in the feature point set 20d may be displayed in the image coordinate system of the image frame T1, and positions of feature points included in the feature point set 20e may be displayed in the image coordinate system of the image frame T2.

The in-vehicle terminal 20b may perform feature point matching on the feature point set 20d and the feature point set 20e through a matching algorithm, determine matching feature points between the feature point set 20d and the feature point set 20e by using a distance between two feature point descriptors (or may be referred to as descriptive features) as a matching principle, to obtain a matching feature point set 20f corresponding to the image frame group 1, where image coordinates corresponding to each matching feature point in the matching feature point set 20f may be: an average value of image coordinates on the image frame T1 and the image frame T2. For example, when a distance between a feature point 1 in the feature point set 20d and a feature point 2 in the feature point set 20e is less than a distance threshold (the distance threshold may be manually set, and for example, the distance threshold is set to 0.8), the feature point 1 and the feature point 2 are determined as a matching feature point A between the image frame T1 and the image frame T2. If image coordinates of the feature point 1 are represented as (u1, v1) and image coordinates of the feature point 2 are represented as (u2, v2), image coordinates of the matching feature point A may be represented as ((u1+u2)/2, (v1+v2)/2).

Further, a Delaunay triangulation network 20g corresponding to the image frame group 1 may be constructed according to the matching feature point set 20f. The Delaunay triangulation network 20g includes connected but non-overlapping triangles, a circumscribed circle of each triangle does not include any other matching feature points other than vertexes of the current triangle, and vertexes of each triangle in the Delaunay triangulation network 20g are matching feature points in the matching feature point set 20f.

The in-vehicle terminal 20b may remove abnormal matching feature points in the matching feature point set 20f according to the Delaunay triangulation network 20g. For any triangle (vertexes of the triangle may be respectively represented as: a vertex A, a vertex B, and a vertex C) in the Delaunay triangulation network 20g, a coordinate change value of a side length AB, a coordinate change value of a side length BC, and a coordinate change value of a side length AC of the triangle may be calculated according to coordinates of the three vertexes in the image frame T1 and the image frame T2 respectively. The abnormal matching feature points in the matching feature point set 20f is filtered based on the coordinate change values of the three side lengths in each triangle, to delete the abnormal matching feature points from the matching feature point set 20f. The in-vehicle terminal 20b may update the Delaunay triangulation network 20g according to a matching feature point set from which the abnormal matching feature points are deleted, to generate a Delaunay triangulation network 20h corresponding to the image frame group 1. Based on the same operation process, Delaunay triangulation networks respectively corresponding to the N image frame groups may be finally obtained, and the motion state of the driving vehicle is evaluated according to the Delaunay triangulation networks respectively corresponding to the N image frame groups. The motion state of the driving vehicle may include a static state, a non-static state, and a linear motion state, and the motion state of the driving vehicle may be used for assisting a satellite positioning device of the vehicle. In the embodiments of this application, a Delaunay triangulation network may be constructed according to matching feature points between adjacent image frames, and the motion state of the vehicle may be evaluated based on the Delaunay triangulation network, thereby improving the evaluation accuracy of the motion state of the vehicle.

Figure 3:
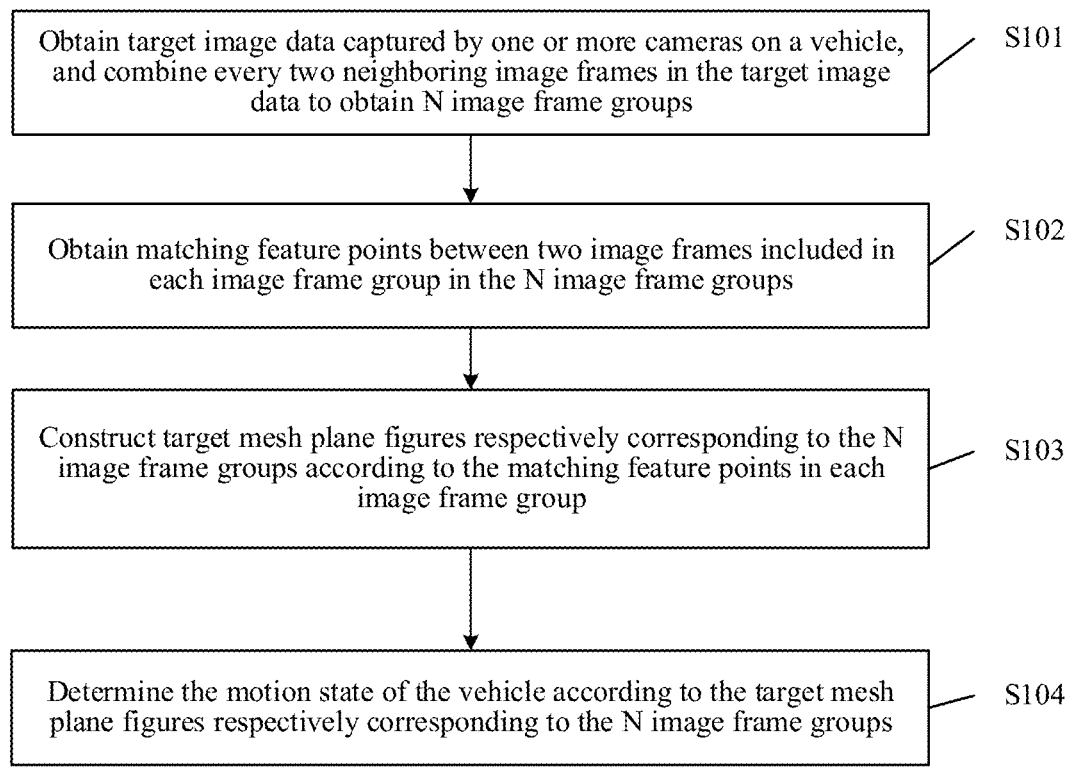
FIG. 3 is a schematic flowchart of a method for evaluating a motion state of a vehicle according to an embodiment of this application.

Referring to FIG. 3, FIG. 3 is a schematic flowchart of a method for evaluating a motion state of a vehicle according to an embodiment of this application. The method for evaluating a motion state of a vehicle may be performed by a computer device, and the computer device may be a mobile terminal configured for the vehicle or may be a server in data connection with the vehicle. As shown in FIG. 3, the method for evaluating a motion state of a vehicle may include the following steps:

S101. Obtain target image data captured by cameras on the vehicle, and combining every two neighboring image frames in the target image data into N image frame groups.

Specifically, a camera (for example, the in-vehicle camera 20a in the embodiment corresponding to FIG. 2) configured for the vehicle may acquire image data (for example, the in-vehicle image data 20c in the embodiment corresponding to FIG. 2) of the vehicle in a driving process. The image data acquired by the camera may be transmitted to the computer device, and after obtaining the image data acquired by the camera, the computer device may determine the acquired image data as target image data. In this case, the target image data may refer to a series of consecutive image frames (for example, N+1 image frames, and N may be 1, 2, 3, . . . ) or video data for the vehicle. When the target image data is N+1 image frames, every two neighboring image frames in the N+1 image frames may be combined to obtain N image frame groups. When the target image data is video data, framing may be performed on the target image data to divide the target image data into N+1 image frames, and every two neighboring image frames in the N+1 image frames are further combined to obtain N image frame groups. For example, the N+1 image frames included in the target image data may be represented according to a time sequence as: an image frame T1, an image frame T2, . . . , an image frame TN, and an image frame TN+1, and the computer device may combine the image frame T1 and the image frame T2 into an image frame group 1, combine the image frame T2 and an image frame T3 into an image frame group 2, . . . , and combine the image frame TN and the image frame TN+1 into an image frame group N, to obtain the N image frame groups.

The vehicle may be a vehicle on the land, a ship in the sea, an airplane in the air, or a spacecraft. The camera may serve as a video input device, the camera may include a binocular camera and a monocular camera or may include a wide-angle camera and a fisheye camera, and a type of the camera is not limited in this application.

S102. Obtain matching feature points between two image frames included in each image frame group in the N image frame groups.

Specifically, the computer device may perform feature point extraction on the target image data, namely, extract feature points from the N+1 image frames respectively, and matching feature points (which may be understood as same feature points between two image frames included in each image frame group) respectively corresponding to the N image frame groups may be obtained according to the feature points extracted from each image frame. For the N image frame groups, an obtaining process of the matching feature points in each image frame group is the same. Therefore, the following describes the obtaining process of the matching feature points by only using any image frame group in the N image frame groups as an example.

The computer device may obtain any image frame group $G_i$ from the N image frame groups, where the image frame group $G_i$ may include an image frame $T_i$ and an image frame $T_{i+1}$, i is a positive integer less than or equal to N, and namely, a minimum value of i is 1, and a maximum value thereof is N. The computer device may further obtain a first feature point set in the image frame $T_i$ (for example, the feature point set 20d in the embodiment corresponding to FIG. 2) and a second feature point set in the image frame $T_{i+1}$ (for example, the feature point set 20e in the embodiment corresponding to FIG. 2), and perform feature point matching on the first feature point set and the second feature point set, to obtain matching feature points between the image frame $T_i$ and the image frame $T_{i+1}$. In other words, the computer device may, through a feature point extraction algorithm, extract feature points from the image frame $T_i$ to obtain the first feature point set, and extract feature points from the image frame $T_{i+1}$ to obtain the second feature point set, and further determine the matching feature points between the first feature point set and the second feature point set according to a matching algorithm. The feature point extraction algorithm may include, but not limited to: a scale-invariant feature transform (SIFT) algorithm, a speeded up robust features (SURF, an improved SIFT algorithm) algorithm, a binary robust invariant scalable keypoints (BRISK, a feature point detection algorithm) algorithm, a binary robust independent elementary features (BRIEF, a binary-coded descriptor) algorithm, a features from accelerated segment test (FAST, a feature point detection algorithm) algorithm, and an oriented FAST and rotated BRIEF, a fast feature point extraction and description algorithm) algorithm. The matching algorithm may include, but not limited to: a BruteForce algorithm, a k-nearest neighbors (KNN) algorithm, a fast library for approximate nearest neighbors (FLANN) algorithm.

During feature point extraction, the computer device may construct a scale space for the image frame $T_i$ and the image frame $T_{i+1}$, search for a first key point position set corresponding to the image frame $T_i$ in the scale space, and search for a second key point position set corresponding to the image frame $T_{i+1}$ in the scale space. Further, the computer device may determine, according to a local gradient corresponding to a first key point position included in the first key point position set, a first descriptive feature corresponding to the first key point position, and obtain the first feature point set of the image frame $T_i$ according to the first key point position and the first descriptive feature, where a feature point included in the first feature point set may be shown in the following formula (1):

$$\mathcal{F}^i = \{f_1^i, f_2^i, \ldots \ldots, f_{m_i}^i\}, f_j^i = \begin{bmatrix} u_j^i \\ v_j^i \end{bmatrix}, j = 1, 2, \ldots \ldots, m_i \quad (1)$$

$$\prod{}^i = \{\xi_1^i, \xi_2^i, \ldots \ldots, \xi_{m_i}^i\}$$

$F^i$ may represent the first key point position set corresponding to the image frame $T_i$, namely, $F^i$ may represent a coordinate set formed by first key point positions of all feature points in the first feature point set; $f_j^i$ may represent coordinates of a $j^{th}$ feature point in the first feature point set, $u_j^i$ may represent a U-axis coordinate of the $j^{th}$ feature point in an image coordinate system, and $v_j^i$ may represent a V-axis coordinate of the $j^{th}$ feature point in the image coordinate system; $m_i$ may represent the number of feature points included in the first feature point set; and $\Pi^1$ may represent a descriptive feature set formed by first descriptive features of all the feature points in the first feature point set, and $\xi_1^i$ may represent a first descriptive feature of a first feature point in the first feature point set.

The computer device may determine, according to a local gradient corresponding to a second key point position included in the second key point position set, a second descriptive feature corresponding to the second key point position, and obtain the second feature point set of the image frame $T_{i+1}$ according to the second key point position and the second descriptive feature. For a representation form of each feature point included in the second feature point set, reference may be made to the foregoing formula (1). For the second feature point set, $F^i$ may be replaced with $F^{i+1}$, and $\Pi^i$ may be replaced with $\Pi^{i+1}$, where $F^{i+1}$ represents a coordinate set formed by second key point positions of all feature points in the second feature point set, and $\Pi^{i+1}$ represents a descriptive feature set formed by second descriptive features of all the feature points in the second feature point set. In other words, no matter the image frame $T_i$ or the image frame $T_{i+1}$, the computer device may extract a key point in the image frame (the image frame $T_i$ or the image frame $T_{i+1}$), and search for pixels having a specific feature in the image frame (in this case, the specific feature is associated with an adopted feature point extraction algorithm), and may further calculate a descriptive feature (or may be referred to as a descriptor) of the key point according to a position of the key point, where the position of the key point and the corresponding descriptive feature may be referred to as a feature point in the image frame. The first feature point set may include one or more feature points, the second feature point set may include one or more feature points, and the number of feature points included in the first feature point set and the number of feature points included in the second feature point set may be the same or may be different. Feature point extraction algorithms adopted for the N image frame groups are the same.

After the first feature point set of the image frame $T_i$ and the second feature point set of the image frame $T_{i+1}$ are obtained, the computer device may obtain a first feature point $a_t$ from the first feature point set and obtain a second feature point $b_k$ from the second feature point set, where t is a positive integer less than or equal to the number of the feature points included in the first feature point set, and k is a positive integer less than or equal to the number of the feature points included in the second feature point set.

Further, the computer device may determine a matching degree between the first feature point $a_t$ and the second feature point $b_k$ according to a first descriptive feature corresponding to the first feature point $a_t$ and a second descriptive feature corresponding to the second feature point $b_k$; and determine, when the matching degree is greater than a matching threshold, the first feature point $a_t$ and the second feature point $b_k$ as matching feature points between the image frame $T_i$ and the image frame $T_{i+1}$. In other words, for any feature point in the first feature point set, matching degrees between the feature point and all the feature points included in the second feature point set need to be calculated respectively, and two feature points whose matching degree is greater than the matching threshold are determined as the matching feature points between the image frame $T_i$ and the image frame $T_{i+1}$. That is, it indicates that two feature points whose matching degree is greater than the matching threshold are a same feature point in different image frames, and two feature points whose matching degree is less than or equal to the matching threshold are different feature points in different image frames, where the matching degree may refer to a distance between descriptive features corresponding to two feature points and calculated according to the matching algorithm, and the distance may include, but not limited to, a Mahalanobis distance or a Hamming distance.

A feature point in the first feature point set match at most one feature point in the second feature point set, namely, for any feature point $a_t$ in the first feature point set, no matching feature point or one matching feature point exists in the second feature point set. For example, the first feature point set includes a feature point a1, a feature point a2, and a feature point a3, and the second feature point set includes a feature point b1, a feature point b2, a feature point b3, and a feature point b4. Matching degrees between the feature point a1 and the feature point b1, the feature point b2, the feature point b3, and the feature point b4 may be calculated respectively, and if the feature point b2 whose matching degree is greater than the matching threshold exists in the feature point b1, the feature point b2, the feature point b3, and the feature point b4, the feature point a1 and the feature point b2 may be determined as matching feature points between the image frame $T_i$ and the image frame $T_{i+1}$. Similarly, matching degrees between the feature point a2 and the feature point b1, the feature point b2, the feature point b3, and the feature point b4 may be calculated respectively, and if no feature point whose matching degree is greater than the matching threshold exists in the feature point b1, the feature point b2, the feature point b3, and the feature point b4, it may be determined that no feature point same as the feature point a2 exists in the image frame $T_{i+1}$. Matching degrees between the feature point a3 and the feature point b1, the feature point b2, the feature point b3, and the feature point b4 are calculated respectively, and if the feature point b4 whose matching degree is greater than the matching threshold exists in the feature point b1, the feature point b2, the feature point b3, and the feature point b4, the feature point a3 and the feature point b4 may be determined as matching feature points between the image frame $T_i$ and the image frame $T_{i+1}$, and in this case, two matching feature points exist between the image frame $T_i$ and the image frame $T_{i+1}$. It may be understood that, when matching degrees between feature points in the first feature point set and the second feature point set are calculated, parallel calculation may be performed, and serial calculation may also be performed. The computer device may calculate matching degrees between the feature points in the first feature point set and the feature points in the second feature point set in a parallel manner, and further determine the matching feature points between the image frame $T_i$ and the image frame $T_{i+1}$ according to all calculated matching degrees. Alternatively, the computer device may calculate matching degrees between the feature points in the first feature point set and the feature points in the second feature point set in a serial manner, namely, the computer device may stop, when a feature point matching a feature point $a_t$ is determined from the second feature point set, calculating matching degrees between the feature point $a_t$ and other feature points in the second feature point set. For example, in a case of determining that the matching degree between the feature point a1 and the feature point b2 is greater than the matching threshold, matching degrees between the feature point a1 and other feature points other than the feature point b2 in the second feature point set do not need to be calculated subsequently.

Figure 4:
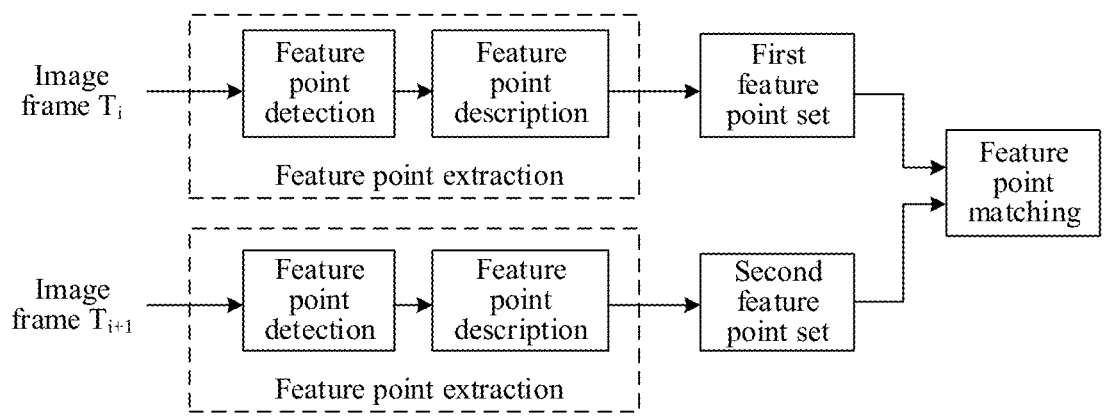
FIG. 4 is a schematic diagram of feature point extraction performed in two image frames according to an embodiment of this application.

Referring to FIG. 4 together, FIG. 4 is a schematic diagram of feature point extraction performed in two image frames according to an embodiment of this application. The SIFT algorithm is used as an example to describe a feature point extraction process. As shown in FIG. 4, the SIFT algorithm may be used to perform feature point extraction on the image frame $T_i$ and the image frame $T_{i+1}$ that are adjacent, and the feature point extraction process may include two parts: feature point detection and feature point description. The SIFT algorithm may be used for detecting and describing local features in an image. The algorithm may find an extreme point in a space size, and extract a position, a scale, and a rotation invariant of the extreme point. A feature point extracted through the SIFT algorithm may be referred to as an SIFT feature, and the SIFT feature is based on points of interest of some local appearance of the image and is not related to a size or rotation of the image.

The computer device may construct a scale space of the image frame $T_i$, the scale space may be represented by using a Gaussian pyramid, and the Gaussian pyramid may be obtained by performing blurring and down-sampling processing the image frame $T_i$ through a Gaussian function. That is, Gaussian blurring of different scales may be performed on the image frame $T_i$, and down-sampling processing is performed on the image frame $T_i$, where in this case, the down-sampling processing may be dot interlaced sampling processing. The Gaussian pyramid of the image frame $T_i$ introduces a Gaussian filter on the basis of an image pyramid formed through simple down-sampling. The image pyramid may refer to continuously performing reduced-order sampling processing on the image frame $T_i$ to obtain a series of images in different sizes, and constructing the series of images from big to small and from bottom to top into a tower-shaped model. The image frame $T_i$ may be a first layer of the image pyramid, and a new image obtained through each down-sampling may serve as one layer in the image pyramid (each layer in the image pyramid is an image). Further, Gaussian blurring may be performed on each layer of image in the image pyramid by using different parameters, so that each layer of the image pyramid may include a plurality of Gaussian-blurred images, and in this case, the image pyramid may be referred to as a Gaussian pyramid. The Gaussian blurring is an image filter, which may use normal distribution (namely, a Gaussian function) to calculate a blurring template, and use the blurring template and the image frame $T_i$ to perform convolution operation, to blur an image.

After the scale space (namely, the foregoing Gaussian pyramid) of the image frame $T_i$ is constructed, the SIFT algorithm may include steps such as scale space extrema detection, key point positioning, direction determining, and key point description, and the scale space extrema detection, the key point positioning, and the direction determining in this case may be referred to as a feature point detection process. The scale space extrema detection may include searching for image positions on all scales, namely, identifying potential points of interest invariant to scales and rotation through a Gaussian differentiation function, where there may be a plurality of points of interest in this case. The key point positioning may include determining a position and a scale of a key point in the Gaussian pyramid from the points of interest through a finely fitted model, where selection of the key point depends on the stability of the points of the interest. The direction determining may include allocating one or more directions to a position of each feature point based on a local gradient direction of an image in the image frame $T_i$, so that the image frame $T_i$ may be operated by transforming the direction, the scale, and the position of the key point. The key point description may include measuring a local gradient of an image on a selected scale in the Gaussian pyramid in an adjacent domain around each key point, where the gradient may be transformed into a vector representation, and the vector representation may permit relatively great local shape deformation and illumination changes. According to the foregoing feature point detection and feature point description parts, the first feature point set corresponding to the image frame $T_i$ may be obtained. Similarly, the second feature point set corresponding to the image frame $T_{i+1}$ may be obtained based on the same processing procedure. The computer device may perform feature point matching on the first feature point set and the second feature point set to obtain the matching feature points between the image frame $T_i$ and the image frame $T_{i+1}$.

Figure 5:
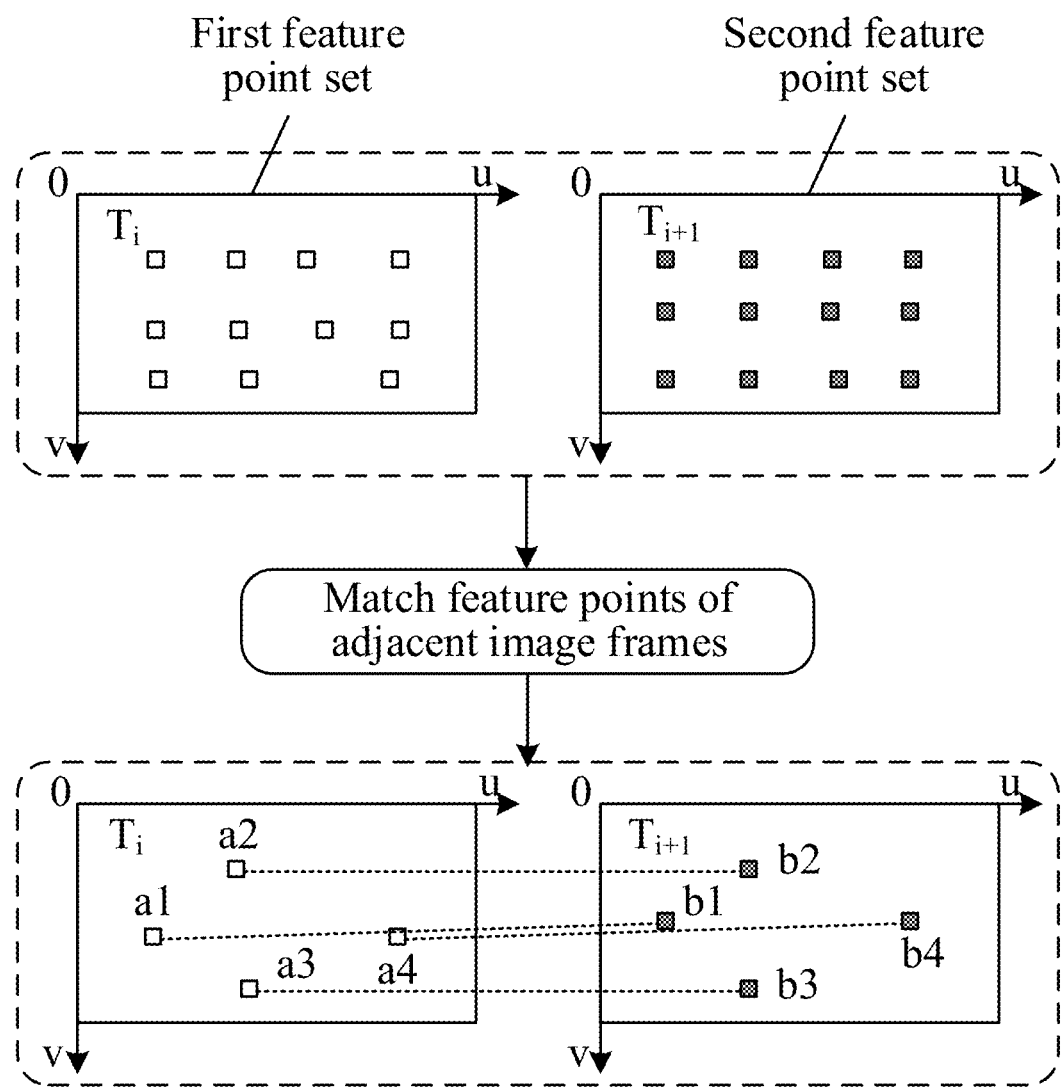
FIG. 5 is a schematic diagram of feature point matching performed between two image frames according to an embodiment of this application.

For the feature point matching process between the first feature point set and the second feature point set, reference may be made to FIG. 5, and FIG. 5 is a schematic diagram of feature point matching performed between two image frames according to an embodiment of this application. The KNN algorithm is used as an example to describe the feature point matching process between the first feature point set and the second feature point set. As shown in FIG. 5, an image coordinate system of the image frame $T_i$ and an image coordinate system of the image frame $T_{i+1}$ may be established, position coordinates of the feature points included in the first feature point set are represented in the image coordinate system of the image frame $T_i$, and position coordinates of the feature points included in the second feature point set are represented in the image coordinate system of the image frame $T_{i+1}$. The computer device may calculate distances between any feature point $a_t$ in the first feature point set and all the feature points included in the second feature point set respectively (the distance may refer to a distance such as a Mahalanobis distance or a Hamming distance between descriptive features corresponding to different feature points, and a smaller distance between two feature points indicates a larger matching degree between the two feature points), may further sort the distances in ascending order, select K feature points with smallest distance, determine appearance frequencies of the feature point $a_t$ corresponding to the first K feature points in the second feature point set, and determines a feature point with the highest appearance frequency in the first K feature points as a feature point same as the feature point $a_t$. As shown in FIG. 5, a feature point a1 in the first feature point set and a feature point b1 in the second feature point set are matching feature points, a feature point a2 in the first feature point set and a feature point b2 in the second feature point set are matching feature points, a feature point a3 in the first feature point set and a feature point b3 in the second feature point set are matching feature points, and a feature point a4 in the first feature point set and a feature point b4 in the second feature point set are matching feature points.

S103. Construct target mesh plane figures respectively corresponding to the N image frame groups according to the matching feature points in each image frame group.

Specifically, the computer device may construct target mesh plane figures respectively corresponding to the N image frame groups according to the matching feature points respectively corresponding to each image frame group. That is, one image frame group may correspond to one target mesh plane figure, each target mesh plane figure may include a plurality of connected but non-overlapping polygons, a circumscribed circle of each polygon does not include any matching feature point, and vertexes of each polygon may be the matching feature points in each image frame group. In the embodiments of this application, the target mesh plane figure may be a Delaunay triangulation network, the polygons in the target mesh plane figure may all be triangles, and the computer device may construct a corresponding Delaunay triangulation network for each image frame group according to the empty circumscribed circle property and the largest minimum angle property of the Delaunay triangulation network.

A method for constructing a Delaunay triangulation network may include, but not limited to: a segmentation and merging algorithm, a point-by-point insertion algorithm, and a recursive growth algorithm. The segmentation and merging algorithm may segment matching feature points corresponding to a single image frame group into point subsets that is easy to triangulation (for example, each point subset may include 3 or 4 matching feature points), perform triangulation processing on each point subset, optimize a triangulated triangulation network into a Delaunay triangulation network through a local optimization procedure (LOP) algorithm, and may further merge the Delaunay triangulation network of each point subset to form a final Delaunay triangulation network. The point-by-point insertion algorithm may construct initial triangles of all matching feature points in a single image frame group, store the initial triangles in a triangle linked list, and may further insert the matching feature points in the image frame group into the triangle linked list sequentially, so that a Delaunay triangulation network corresponding to the image frame group is formed after all the matching feature points in the image frame group are inserted into the triangle linked list. The recursive growth algorithm may select any matching feature point 1 from matching feature points corresponding to a single image frame group, search for a matching feature point 2 that is closest to the matching feature point 1, connect the matching feature point 1 and the matching feature point 2 as an initial baseline 1-2, search for a matching feature point 3 on one side (for example, a right side or a left side) of the initial baseline 1-2 by adopting a Delaunay principle to form a first Delaunay triangle, use two new sides (a side length 2-3 and a side length 1-3) of the Delaunay triangle as a new initial baseline, and repeat the foregoing steps until all the matching feature points in the image frame group are processed, to obtain a Delaunay triangulation network corresponding to the image frame group.

S104. Determine the motion state of the vehicle according to the target mesh plane figures respectively corresponding to the N image frame groups.

Specifically, the computer device may determine the motion state of the vehicle according to an average coordinate change value of each triangle in the Delaunay triangulation network, and the motion state of the vehicle may be a static state or a non-static state in this case; or determine the motion state of the vehicle according to direction change values respectively corresponding to three sides included in each triangle in the Delaunay triangulation network, and the motion state of the vehicle may be a linear motion state or a non-linear motion state. The motion state of the vehicle may be used for providing an assistance foundation for positioning and navigation of the vehicle.

In some embodiments, positioning information of the vehicle may be determined according to a positioning and navigation system (for example, satellite positioning) when the motion state of the vehicle is the static state; and when the motion state of the vehicle is the linear motion state, a motion direction of the vehicle may be determined according to the linear motion state, and the positioning information of the vehicle may be determined according to the motion direction and the positioning and navigation system. In other words, the motion state of the vehicle may effectively assist the positioning and navigation system, and may further improve the positioning precision of a terminal configured for the vehicle. In a driving process of the vehicle, an accurate motion state may effectively assist lane-level positioning and navigation.

In the embodiments of this application, the target image data captured by one or cameras mounted on the vehicle may be obtained, the matching feature points between two adjacent image frames are extracted, the target mesh plane figure corresponding to the two adjacent image frames is constructed according to the matching feature points between the two adjacent image frames, and the motion state of the vehicle may be accurately evaluated based on the target mesh plane figure, so that the evaluation accuracy of the motion state of the vehicle may be improved. The motion state of the vehicle may effectively assist the positioning and navigation system, and may further improve the positioning precision of a terminal configured for the vehicle.

Figure 6:
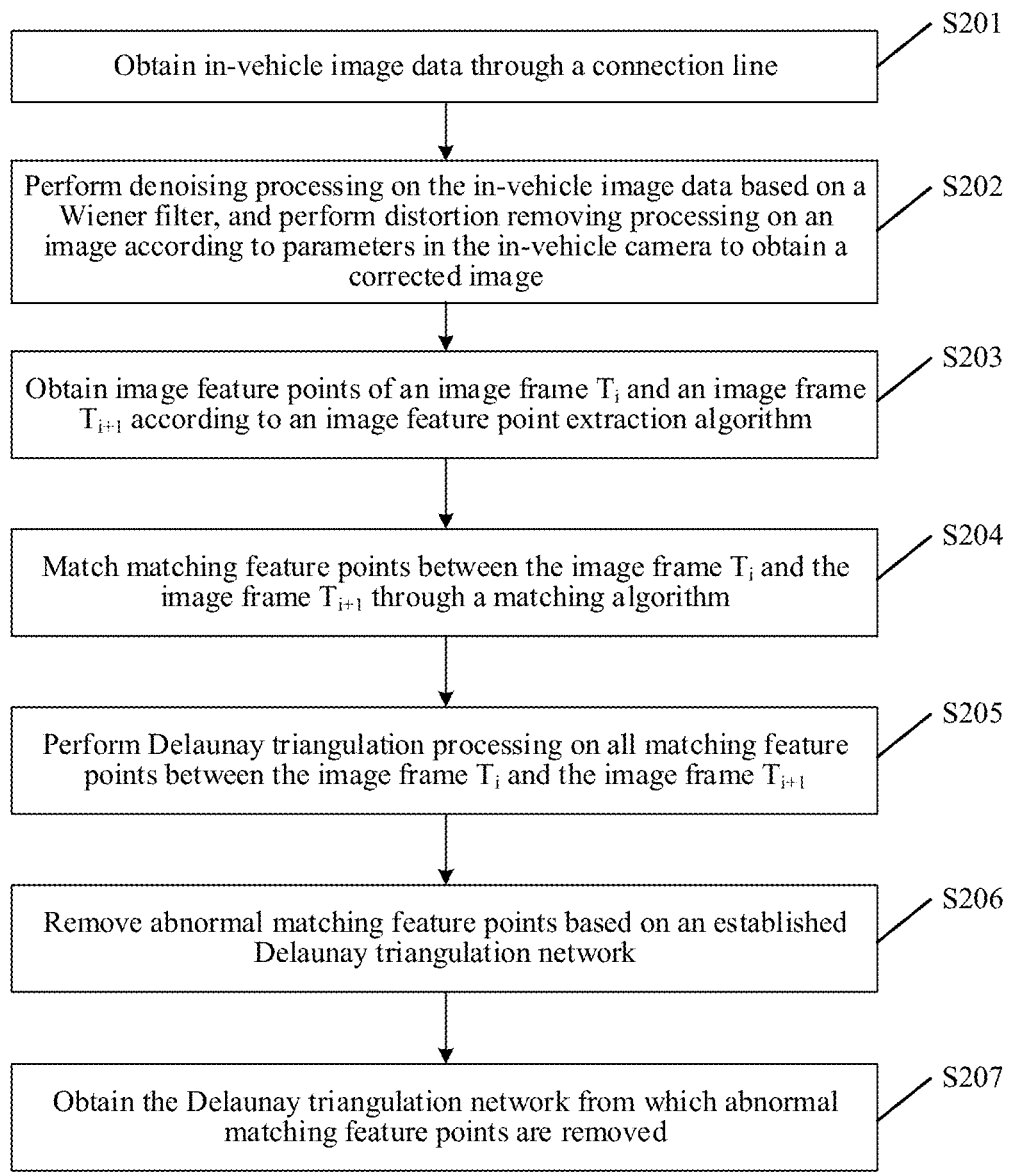
FIG. 6 is a schematic flowchart of obtaining a target mesh plane figure according to an embodiment of this application.

Further, referring to FIG. 6, FIG. 6 is a schematic flowchart of obtaining a target mesh plane figure according to an embodiment of this application. In this embodiment of this application, step S101 to step S103 in the embodiment corresponding to FIG. 3 are described in more detail by using an example in which the target mesh plane figure is a Delaunay triangulation network. As shown in FIG. 6, an obtaining process of the target mesh plane figure may include the following step S201 to step S207.

S201. Obtain in-vehicle image data through a connection line.

Specifically, a computer device may obtain original image data for a vehicle acquired by a camera. When the vehicle is a driving vehicle, in this case, the computer device may be an in-vehicle terminal, the camera may be a front-facing camera or a driving recorder camera configured for the driving vehicle, and the original image data may be in-vehicle image data. The in-vehicle image data may refer to image data acquired by the camera within a period of time. For example, the in-vehicle image data may refer to N+1 image frames acquired by the camera within 1 second.

Figure 7:
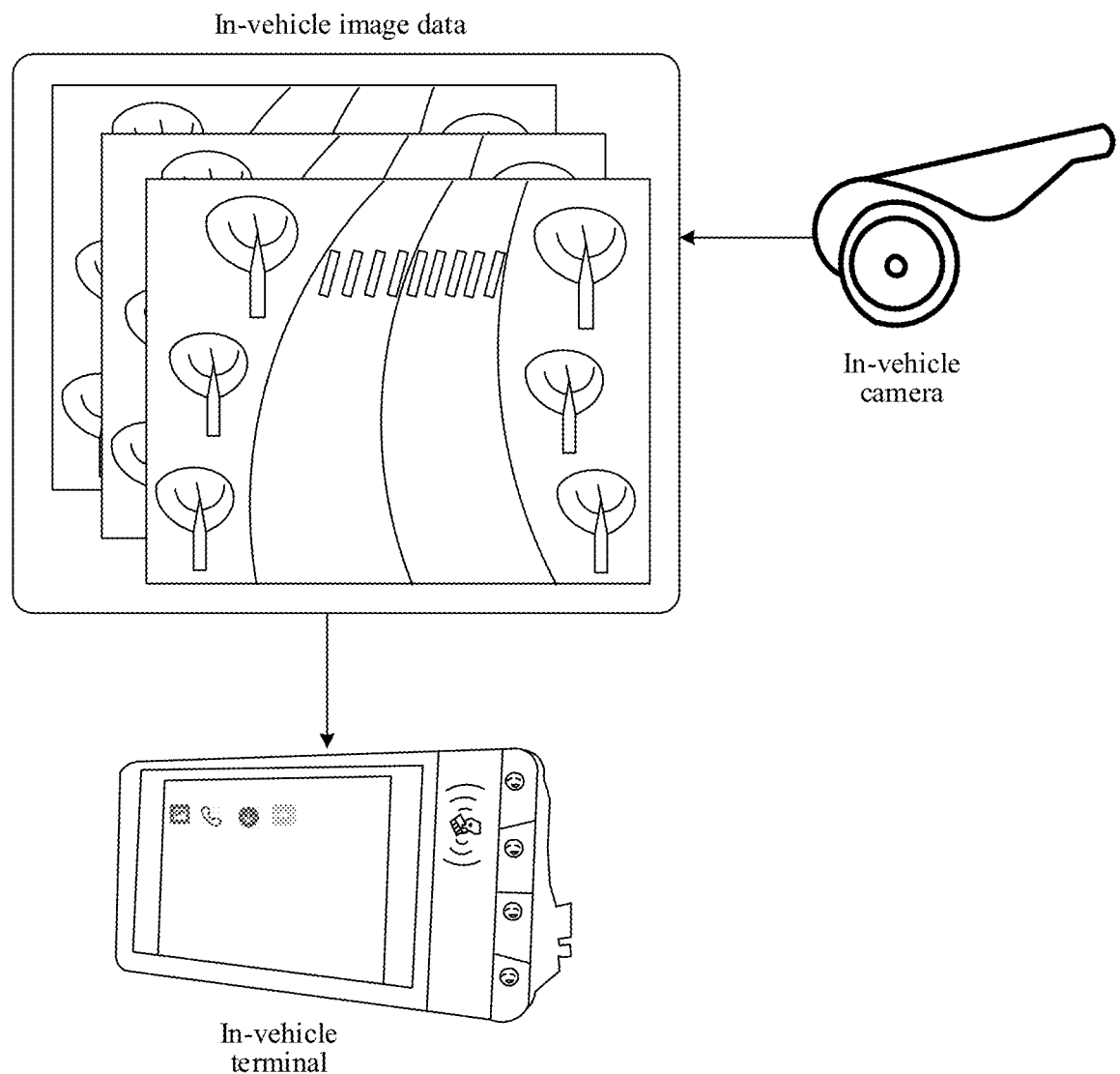
FIG. 7 is a schematic diagram of obtaining original image data according to an embodiment of this application.

Referring to FIG. 7 together, FIG. 7 is a schematic diagram of obtaining original image data according to an embodiment of this application. As shown in FIG. 7, the in-vehicle terminal 30e may obtain in-vehicle image data acquired by the in-vehicle camera 30a through a universal serial bus (USB) or a high definition multimedia interface (HDMI) connection line, where the in-vehicle image data may be a plurality of image frames in an RGB (a color standard, where R represents color, G represents green, and B represents blue) format, such as an image frame 30b, an image frame 30c, and an image frame 30d.

S202. Perform denoising processing on the in-vehicle image data based on a Wiener filter, and perform distortion removing processing on an image according to parameters in the in-vehicle camera to obtain a corrected image.

Specifically, after obtaining the in-vehicle image data (namely, the original image data) acquired by the camera, the computer device may perform denoising processing on the in-vehicle image data to obtain denoised image data, and may further perform distortion removing processing on the denoised image data according to device parameters corresponding to the camera to obtain target image data associated with the vehicle. The target image data is divided into N+1 image frames, every two neighboring image frames in the N+1 image frames are combined to obtain N image frame groups, and in this case, image frames included in the N image frame groups are all corrected images obtained through denoising processing and distortion removing processing.

The denoising processing process of the in-vehicle image data may be implemented through a Wiener filter (which may be referred to as a least square filter), noise and interference may be filtered from the in-vehicle image data through the Wiener filter. The Wiener filter may refer to a linear filter using a least square as an optimal principle, and in a specific constraint condition, a square of a difference between an output and a desired output of the Wiener filter is minimized, which may be finally converted into a problem of calculating a solution to a Toeplitz equation through mathematical calculation. The device parameters corresponding to the camera may be parameters in the in-vehicle camera, and the distortion removing processing on the in-vehicle image data may be implemented based on the parameters in the in-vehicle camera. The denoising processing and the distortion removing processing belong to a pre-processing process of the in-vehicle image data, and the pre-processing process of the in-vehicle image data may further include deblurring processing and smoothing processing, and a method adopted in the pre-processing process is not specifically limited in the embodiments of this application.

Figure 8:
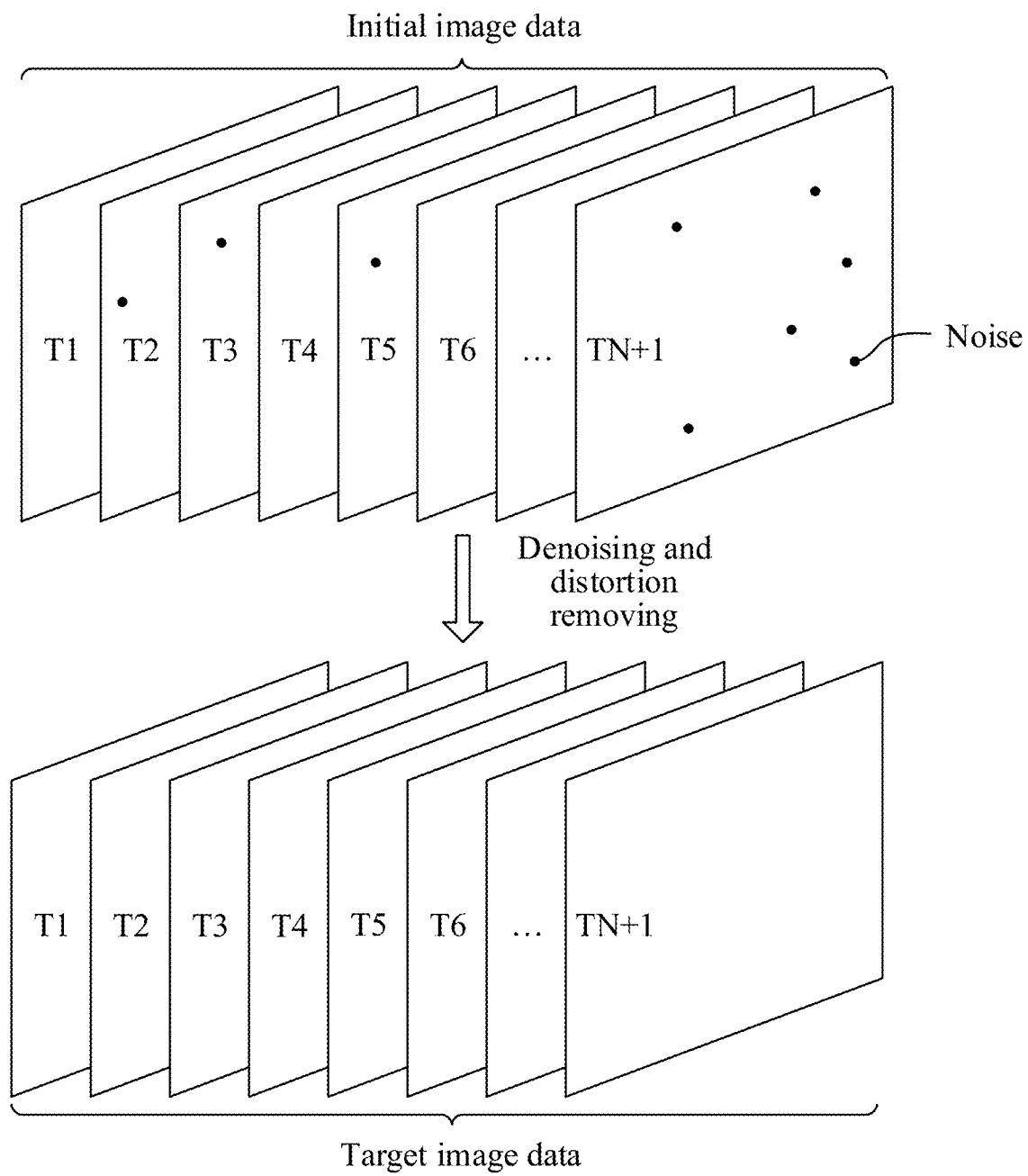
FIG. 8 is a schematic diagram of denoising and distortion removing processing performed on original image data according to an embodiment of this application.

Referring to FIG. 8 together, FIG. 8 is a schematic diagram of denoising and distortion removing processing performed on original image data according to an embodiment of this application. As shown in FIG. 8, the original image data (namely, the in-vehicle image data obtained from the in-vehicle camera through the USB or HDMI connection line) obtained by the computer device may include N+1 image frames, which are respectively an image frame T1, an image frame T2, . . . , and an image frame TN+1. Due to factors such as the camera and data transmission, the N+1 image frames included in the original image data may have distortion or have noise data, so that the computer device may perform denoising processing on the N+1 image frames included in the original image data by using the Wiener filter. Meanwhile, distortion removing processing may be performed on the N+1 image frames included in the original image data according to the parameters in the in-vehicle camera, the N+1 image frames on which denoising processing and distortion removing processing have been performed are determined as the target image data, and N image frame groups may be obtained by combining every two adjacent image frames in the N+1 image frames in the target image data.

S203. Obtain image feature points of an image frame $T_i$ and an image frame $T_{i+1}$ according to an image feature point extraction algorithm.

S204. Match matching feature points between the image frame $T_i$ and the image frame $T_{i+1}$ through a matching algorithm.

Every image frame group in the N image frame groups includes two adjacent image frames, and the two adjacent image frames are correct image frames on which denoising processing and distortion removing processing have been performed. A generation process of a target mesh plane figure corresponding to each image frame group is similar, and for ease of description, the following describes the generation process of the target mesh plane figure by using any image frame group $G_i$ in the N image frame groups as an example, where the image frame group $G_i$ may include a corrected image frame $T_i$ and a corrected image frame $T_{i+1}$. The generation process of the target mesh plane figure may include a process of extracting feature points of the image frame $T_i$ and the image frame $T_{i+1}$, a process of determining matching feature points between the image frame $T_i$ and the image frame $T_{i+1}$, and a process of constructing a Delaunay triangulation network corresponding to the image frame group $G_i$. Therefore, for a specific implementation of step S203 and step S204, reference may be made to step S102 in the embodiment corresponding to FIG. 3, and details are not described herein again.

S205. Perform Delaunay triangulation processing on all matching feature points between the image frame $T_i$ and the image frame $T_{i+1}$.

Specifically, It is assumed that the number of matching feature points between the image frame $T_i$ and the image frame $T_{i+1}$ is q, the computer device may determine, according to image coordinate information of each matching feature point in the q matching feature points in the image frame $T_i$ and the image frame $T_{i+1}$, matching coordinate information respectively corresponding to the q matching feature points, where the matching coordinate information is an image coordinate average value in the image frame $T_i$ and the image frame $T_{i+1}$, i is a positive integer less than or equal to N, and q is a positive integer. Further, the computer device may obtain an initial polygon linked list associated with the q matching feature points according to the matching coordinate information respectively corresponding to the q matching feature points. For any matching feature point $c_r$ in the q matching feature points, an associated polygon matching the matching feature point $c_r$ is obtained from the initial polygon linked list, where a circumscribed circle of the associated polygon may include the matching feature point $c_r$, r is a positive integer less than or equal to q, namely, a minimum value of r is 1, and a maximum value thereof is q. The computer device may delete a common side of the associated polygon, connect the matching feature point $c_r$ to all vertexes of the associated polygon to generate a candidate polygon corresponding to the matching feature point $c_r$, may further convert the candidate polygon into a target polygon corresponding to the matching feature point $c_r$, and add the target polygon to the initial polygon linked list, where the target polygon meets the empty circumscribed circle property in this case. When target polygons respectively corresponding to the q matching feature points are added to the initial polygon linked list, the initial polygon linked list including the target polygons respectively corresponding to the q matching feature points is determined as a target polygon linked list, and a mesh plane figure corresponding to the image frame group $G_i$ is generated according to the target polygon linked list, where the mesh plane figure in this case may be referred to as a candidate mesh plane figure.

When the mesh plane figure is a Delaunay triangulation network, Delaunay triangulation network processing may be performed on the q matching feature points between the image frame $T_i$ and the image frame $T_{i+1}$ based on a Bowyer-Watson algorithm (a triangulation network generation algorithm), and a process thereof may include: 1. Traverse the q matching feature points, construct an initial triangle including the q matching feature points according to the matching coordinate information respectively corresponding to the q matching feature points, and store the initial triangle into an initial triangle linked list (namely, the initial polygon linked list). 2. Insert each matching feature point in the q matching feature points sequentially (for example, the matching feature point $c_r$ in the q matching feature points), find an affected triangle (namely, the associated polygon) whose circumscribed circle includes the matching feature point $c_r$ from the initial triangle linked list, delete a common side of the affected triangle, and connect the matching feature point $c_r$ to all vertexes of the affected triangle to obtain a candidate triangle (namely, the foregoing candidate polygon) corresponding to the matching feature point $c_r$, so as to complete insertion of the matching feature point $c_r$ in the initial triangle linked list. 3. Optimize the local newly formed candidate triangle according to a Delaunay triangulation network optimization principle to generate a target triangle associated with the matching feature point $c_r$, and store the target triangle into the initial triangle linked list. 4. Perform step 2 and step 3 circularly until the q matching feature points are inserted into the initial triangle linked list, where the initial triangle linked list in this case may be referred to as a target triangle linked list (namely, the target polygon linked list), and the target triangle linked list may be determined as the Delaunay triangulation network corresponding to the image frame group $G_i$.

Figure 9:
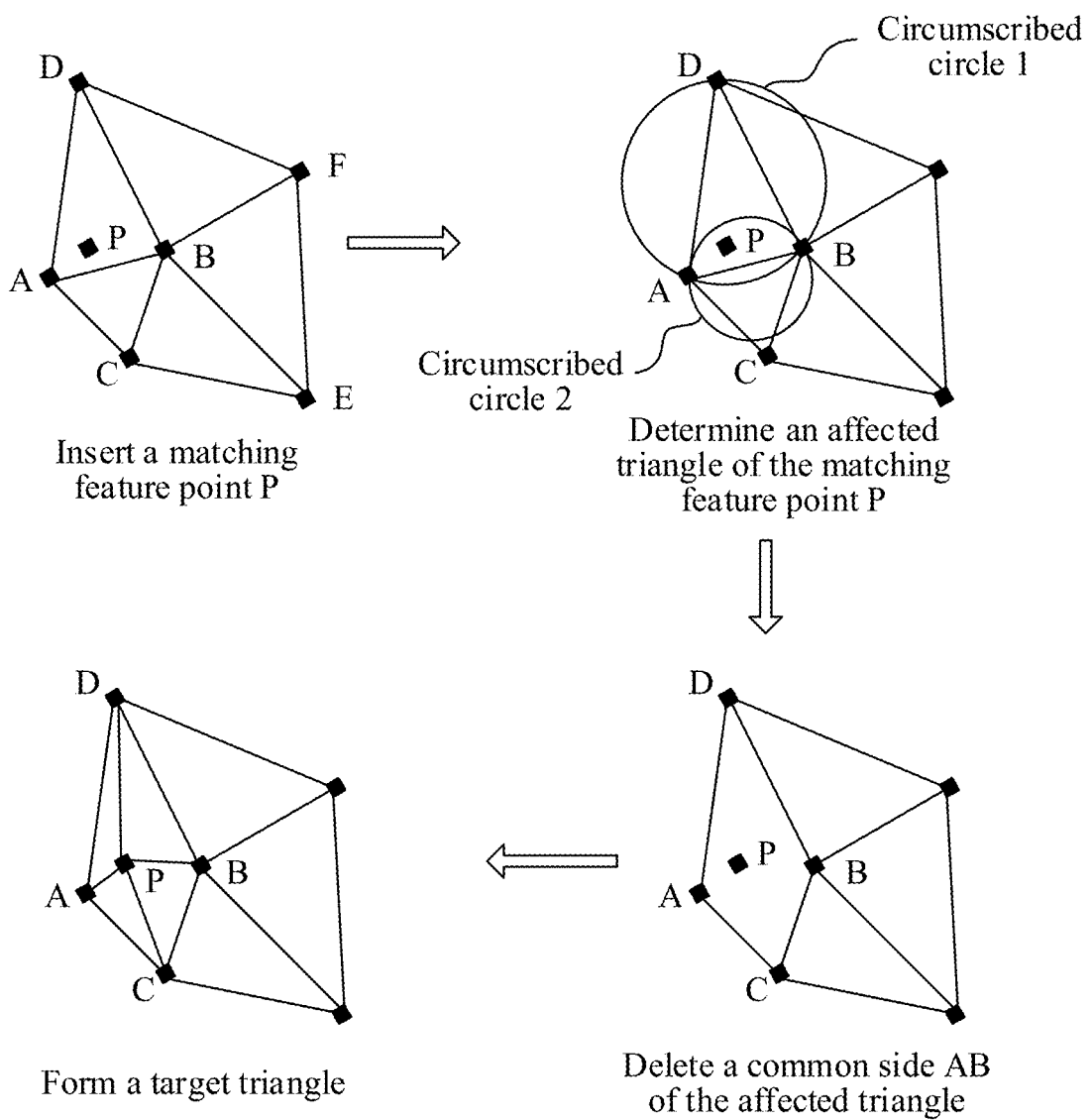
FIG. 9 is a schematic structural diagram of constructing a mesh plane figure according to an embodiment of this application.

Referring to FIG. 9 together, FIG. 9 is a schematic structural diagram of constructing a mesh plane figure according to an embodiment of this application. As shown in FIG. 9, it is assumed that there are 7 matching feature points between the image frame $T_i$ and the image frame $T_{i+1}$, and the 7 matching feature points are respectively represented as a matching feature point A, a matching feature point B, a matching feature point C, a matching feature point D, a matching feature point E, a matching feature point F, and a matching feature point P, after the matching feature point A, the matching feature point B, the matching feature point C, the matching feature point D, the matching feature point E, and the matching feature point F are all inserted into a triangle linked list, the triangle linked list in this case may include a triangle ABD, a triangle ABC, a triangle BCE, a triangle BEF, and a triangle BDF. When inserting the matching feature point P into the triangle linked list, the computer device may search for a triangle whose circumscribed circle includes the matching feature point P from the triangle linked list. As shown in FIG. 9, a circumscribed circle 1 of the triangle ABD and a circumscribed circle 2 of the triangle ABC both includes the matching feature point P, and the triangle ABD and the triangle ABC in this case may be referred to as affected triangles of the matching feature point P.

The computer device may delete a common side AB of the triangle ABD and the triangle ABC, connect the matching feature point P to all vertexes of the triangle ABD and the triangle ABC to form new triangles. That is, the matching feature point P is connected to the matching feature point A, the matching feature point P is connected to the matching feature point B, the matching feature point P is connected to the matching feature point C, and the matching feature point P is connected to the matching feature point D, to form a new triangle ADP, a new triangle ACP, a new triangle BCP, and a new triangle BDP. The triangle ADP, the triangle ACP, the triangle BCP, and the triangle BDP are stored into the triangle linked list, and the Delaunay triangulation network corresponding to the image frame group $G_i$ is generated according to the triangle linked list in this case.

S206. Remove abnormal matching feature points based on an established Delaunay triangulation network.

Specifically, the matching feature points between the image frame $T_i$ and the image frame $T_{i+1}$ may have abnormal matching feature points, so that the computer device may remove the abnormal matching feature points from the Delaunay triangulation network generated according to step S205. The computer device may determine the Delaunay triangulation network generated through step S205 as a candidate mesh plane figure, and obtain any polygon $D_j$ from the candidate mesh plane figure, where j is a positive integer less than or equal to the number of polygons included in the candidate mesh plane figure. Further, the computer device may obtain first vertex coordinates of matching feature points corresponding to the polygon $D_j$ in the image frame $T_i$ and second vertex coordinates of the matching feature points corresponding to the polygon $D_j$ in the image frame $T_{i+1}$. A coordinate change value corresponding to each side length included in the polygon $D_j$ is determined according to the first vertex coordinates and the second vertex coordinates; a side length whose coordinate change value is less than a change threshold is determined as a target side length, normal verification parameters (in this case, the normal verification parameter may be a counter value) corresponding to matching feature points on two ends of the target side length are accumulated to obtain a total value of a normal verification parameter corresponding to each of the matching feature points of the polygon $D_j$; and a matching feature point whose total value of the normal verification parameter is greater than a parameter threshold is determined as a normal matching feature point, and another matching feature point other than the normal matching feature point may be referred to as an abnormal matching feature point. Specifically, matching feature points other than normal matching feature points in the q matching feature points may be further deleted.

It is assumed that the candidate mesh plane figure includes m triangles, and the candidate mesh plane figure in this case may be shown in the following formula (2):

$$\Theta = \{\Delta_{D_1}, \Delta_{D_2}, \ldots, \Delta_{D_m}\} \quad (2)$$

$\Theta$ represents the candidate mesh plane figure corresponding to the image frame group $G_i$, $\Delta_{D_j}$, j=1, 2, ..., m may represent a $j^{th}$ triangle (namely, the polygon $D_j$) in the candidate mesh plane figure, and first vertex coordinates of three vertexes (one vertex corresponds to one matching feature point) of the triangle $\Delta_{D_j}$ in the image frame $T_i$ may be shown in the following formula (3):

$$\left\{ \begin{bmatrix} u^i_{D_{j,1}} \\ v^i_{D_{j,1}} \end{bmatrix}, \begin{bmatrix} u^i_{D_{j,2}} \\ v^i_{D_{j,2}} \end{bmatrix}, \begin{bmatrix} u^i_{D_{j,3}} \\ v^i_{D_{j,3}} \end{bmatrix} \right\} \quad (3)$$

The first vertex coordinates may refer to coordinates of the three vertexes of the triangle $\Delta_{D_j}$ in the image frame $T_i$, $u^i_{D_{j,1}}$, $u^i_{D_{j,2}}$, and $u^i_{D_{j,3}}$ may represent coordinates of the three vertexes of the triangle $\Delta_{D_j}$ on the axis U in the image frame $T_i$ respectively, and $v^{i+1}_{D_{j,1}}$, $v^{i+1}_{D_{j,2}}$, and $v^{i+1}_{D_{j,3}}$ may represent coordinates of the three vertexes of the triangle $\Delta_{D_j}$ on the axis V in the image frame $T_i$ respectively.

Second vertex coordinates of the three vertexes of the triangle $\Delta_{D_j}$ in the image frame $T_{i+1}$ may be shown in the following formula (4):

$$\left\{ \begin{bmatrix} u^{i+1}_{D_{j,1}} \\ v^{i+1}_{D_{j,1}} \end{bmatrix}, \begin{bmatrix} u^{i+1}_{D_{j,2}} \\ v^{i+1}_{D_{j,2}} \end{bmatrix}, \begin{bmatrix} u^{i+1}_{D_{j,3}} \\ v^{i+1}_{D_{j,3}} \end{bmatrix} \right\} \quad (4)$$

The second vertex coordinates may refer to coordinates of the three vertexes of the triangle $\Delta_{D_j}$ in the image frame $T_{i+1}$, $u^{i+1}_{D_{j,1}}$, $u^{i+1}_{D_{j,2}}$, and $u^{i+1}_{D_{j,3}}$ may represent coordinates of the three vertexes of the triangle $\Delta_{D_j}$ on the axis U in the image frame $T_i+1$ respectively, and $v^{i+1}_{D_{j,1}}$, $v^{i+1}_{D_{j,2}}$, and $v^{i+1}_{D_{j,3}}$ may represent coordinates of the three vertexes of the triangle $\Delta_{D_j}$ on the axis V in the image frame $T_{i+1}$ respectively.

When the three vertexes of the triangle $\Delta_{D_j}$ are respectively a matching feature point A, a matching feature point B, and a matching feature point C, the following describes a process of removing abnormal matching feature points by using the triangle $\Delta_{D_j}$ as an example. A coordinate change value of a side length AB in the triangle $\Delta_{D_j}$ is shown in the following formula (5):

$$dAB = |u^{i+1}_{D_{j,1}} - u^i_{D_{j,1}} - (u^{i+1}_{D_{j,2}} - u^i_{D_{j,2}})| + |v^{i+1}_{D_{j,1}} - v^i_{D_{j,1}} - (v^{i+1}_{D_{j,2}} - v^i_{D_{j,2}})| \quad (5)$$

A coordinate change value of a side length BC in the triangle $\Delta_{D_j}$ is shown in the following formula (6):

$$dBC = |u^{i+1}_{D_{j,2}} - u^i_{D_{j,2}} - (u^{i+1}_{D_{j,3}} - u^i_{D_{j,3}})| + |v^{i+1}_{D_{j,2}} - v^i_{D_{j,2}} - (v^{i+1}_{D_{j,3}} - v^i_{D_{j,3}})| \quad (6)$$

A coordinate change value of a side length AC in the triangle $\Delta_{D_j}$ is shown in the following formula (7):

$$dAC = |u^{i+1}_{D_{j,1}} - u^i_{D_{j,1}} - (u^{i+1}_{D_{j,3}} - u^i_{D_{j,3}})| + |v^{i+1}_{D_{j,1}} - v^i_{D_{j,1}} - (v^{i+1}_{D_{j,3}} - v^i_{D_{j,3}})| \quad (7)$$

A counter may be allocated to each matching feature point in the q matching feature points, and if the coordinate change value dAB of the side length AB in formula (5) is less than a change threshold (the change threshold may be preset), the side length AB may be determined as a target side length, and counters of two vertexes (namely, the matching feature point A and the matching feature point B) of the target side length AB may be increased by 1; and if the coordinate change value dAB is greater than or equal to the change threshold, no processing may be performed on the counters of the matching feature point A and the matching feature point B. If the coordinate change value dBC of the side length BC in formula (6) is less than the change threshold, the side length BC may be determined as a target side length, and counters of two vertexes (namely, the matching feature point B and the matching feature point C) of the target side length BC may be increased by 1; and if the coordinate change value dBC is greater than or equal to the change threshold, no processing may be performed on the counters of the matching feature point B and the matching feature point C. If the coordinate change value dAC of the side length AC in formula (7) is less than the change threshold, the side length AC may be determined as a target side length, and counters of two vertexes (namely, the matching feature point A and the matching feature point C)

of the target side length AC may be increased by 1; and if the coordinate change value dAC is greater than or equal to the change threshold, no processing may be performed on the counters of the matching feature point A and the matching feature point C.

The computer device may circularly process each triangle in the candidate mesh plane figure according to formula (5) to formula (7) until the m triangles are all processed, to obtain total values of counters (namely, the total values of the normal verification parameters) respectively corresponding to the q matching feature points. If a total value of the counter of a matching feature point is greater than a parameter threshold (the parameter threshold may be preset, and for example, the parameter threshold is 4), the matching feature point may be determined as a normal matching feature point, and the matching feature point may be reserved; and if a total value of the counter of a matching feature point is less than or equal to the parameter threshold (for example, the parameter threshold is 4), the matching feature point may be determined as an abnormal matching feature point, and the abnormal matching feature point may be deleted.

S207. Obtain the Delaunay triangulation network from which abnormal matching feature points are removed.

Specifically, the computer device may update, according to normal matching feature points, the candidate mesh plane figure to a target mesh plane figure corresponding to the image frame group $G_i$, for example, obtain a Delaunay triangulation network from which abnormal matching feature points are removed according to the normal matching feature points from which the abnormal matching feature points are removed. That is, the computer device may delete triangles including the abnormal matching feature points from the candidate mesh plane figure, to form a final Delaunay triangulation network corresponding to the image frame group $G_i$.

In some embodiments, the computer device may further re-construct, according to the Delaunay triangulation processing process described in step S205, a Delaunay triangulation network according to the normal matching feature points, and the Delaunay triangulation network including the normal matching feature points in this case may be referred to as the target mesh plane figure.

Target Delaunay triangulation networks respectively corresponding to the N image frame groups may be obtained based on step S203 to step S207.

In the embodiments of this application, in-vehicle image data corresponding to a driving vehicle is obtained, matching feature points between two adjacent image frames are extracted, a Delaunay triangulation network corresponding to the two adjacent image frames is constructed by using the matching feature points between the two adjacent image frames, and abnormal matching feature points are removed based on the Delaunay triangulation network. Therefore, the effectiveness of the matching feature points may be improved, and determining a motion state of the driving vehicle based on the Delaunay triangulation network may improve the evaluation accuracy of the motion state of the vehicle.

Figure 10:
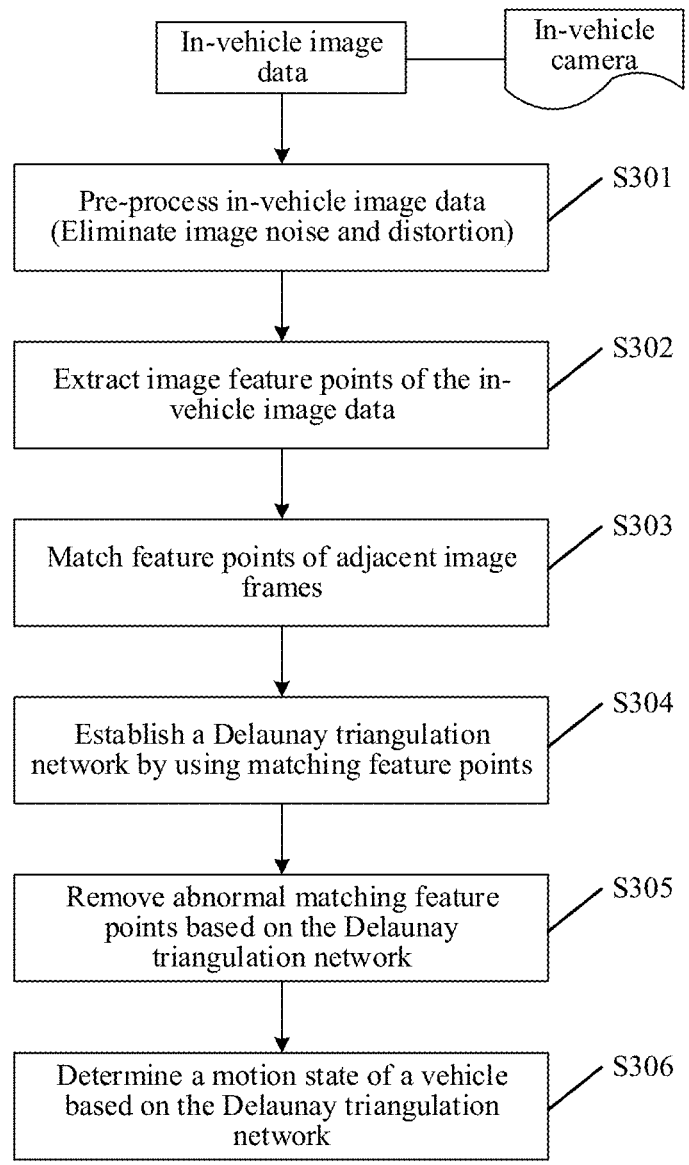
FIG. 10 is a schematic flowchart of a method for evaluating a motion state of a vehicle according to an embodiment of this application.

Referring to FIG. 10, FIG. 10 is a schematic flowchart of a method for evaluating a motion state of a vehicle according to an embodiment of this application. The method for evaluating a motion state of a vehicle may be performed by a computer device, and the computer device may be a mobile terminal configured for the vehicle. As shown in FIG. 10, the method for evaluating a motion state of a vehicle may include the following steps:

S301. Pre-process in-vehicle image data (Eliminate image noise and distortion).

S302. Extract image feature points of the in-vehicle image data.

S303. Match feature points of adjacent image frames.

S304. Establish a Delaunay triangulation network by using matching feature points.

S305. Remove abnormal matching feature points based on the Delaunay triangulation network.

In this embodiment of this application, an implementation procedure of the method for evaluating a motion state of a vehicle is described by using an example in which the vehicle is a driving vehicle and a target mesh plane figure is a Delaunay triangulation network. For specific implementations of step S301 to step S305, reference may be made to step S201 to step S207 in the embodiment corresponding to FIG. 8, and details are not described herein again.

S306. Determine a motion state of a vehicle based on the Delaunay triangulation network.

Figure 11:
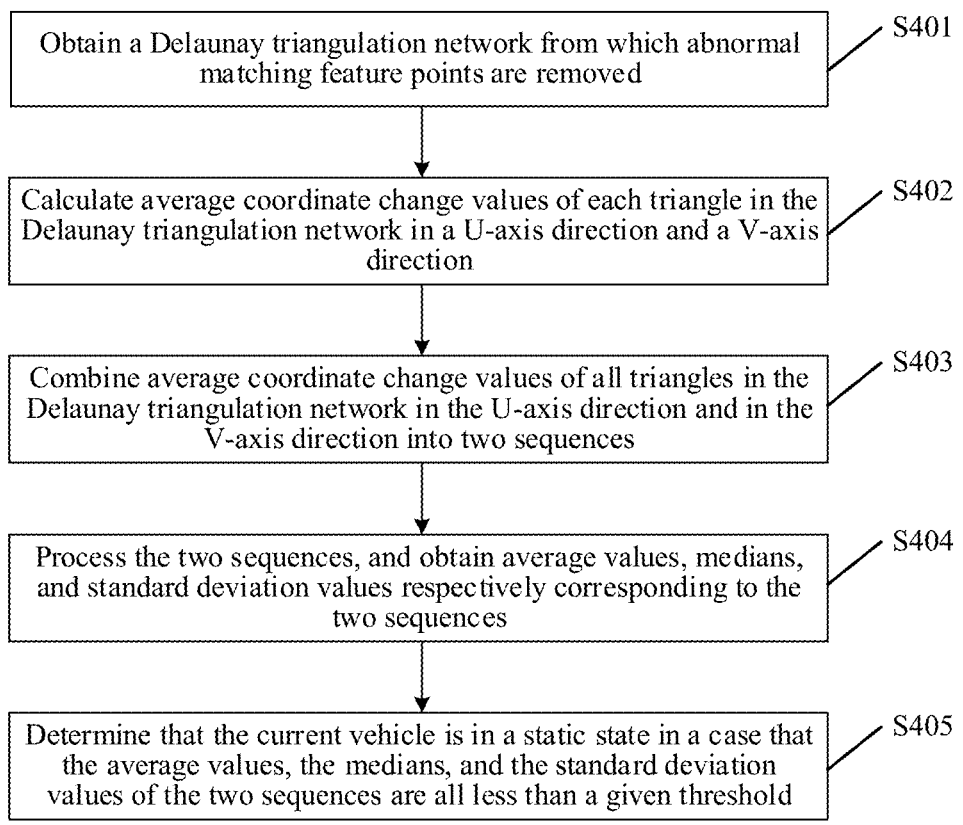
FIG. 11 is a schematic flowchart of determining a static state of a vehicle based on a target mesh plane figure according to an embodiment of this application.
Figure 12:
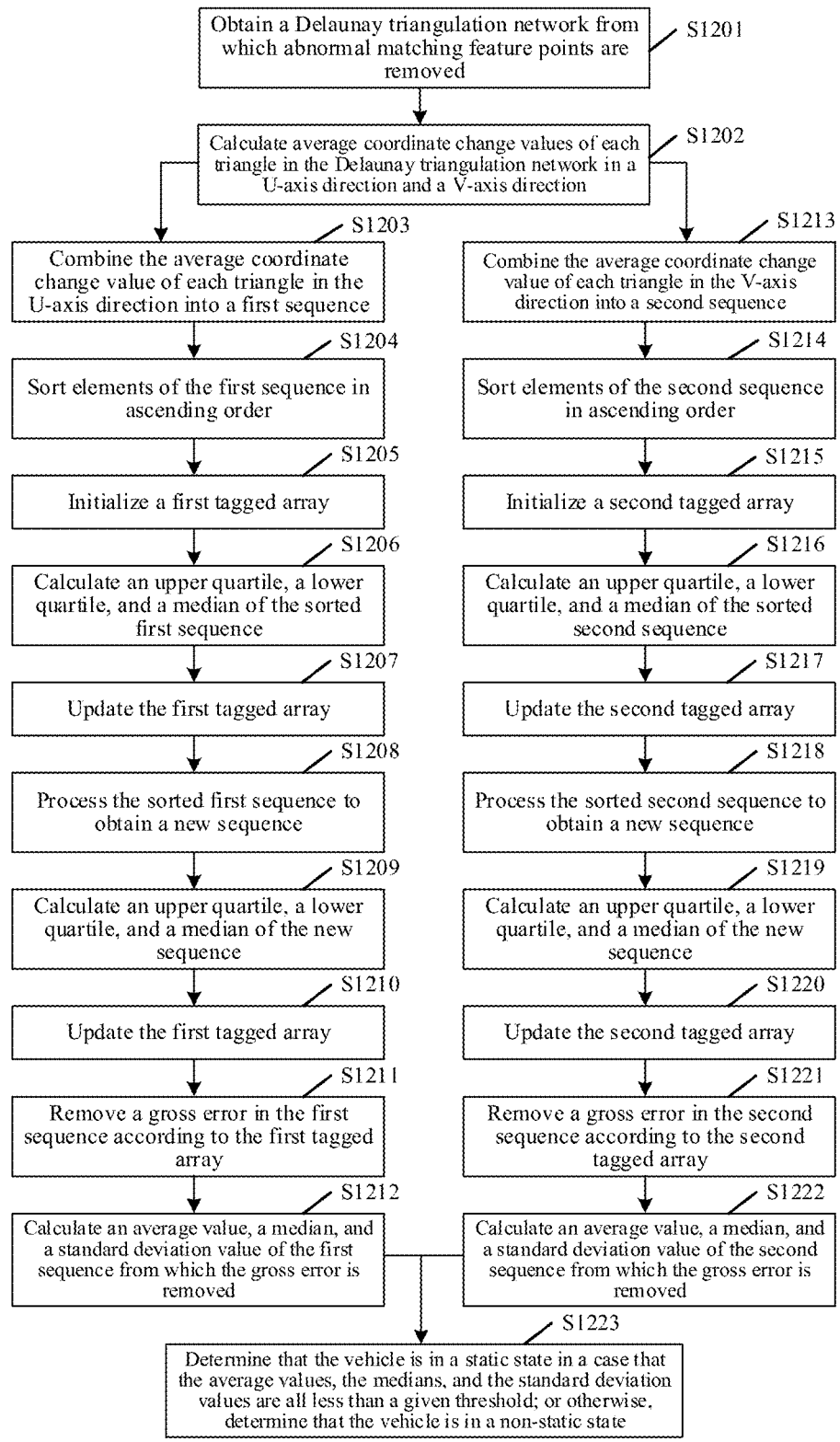
FIG. 12 is a schematic flowchart of determining a static state of a vehicle based on a target mesh plane figure according to an embodiment of this application.

The computer device may determine a motion state of a driving vehicle according to triangles included in the Delaunay triangulation network, and the following describes a process of determining a motion state of a vehicle (or a process of evaluating a motion state of a vehicle) in detail based on FIG. 11 to FIG. 14. FIG. 11 and FIG. 12 describes a process of determining a static motion state, and FIG. 13 and FIG. 14 describes a process of determining a linear motion state of the vehicle.

Referring to FIG. 11, FIG. 11 is a schematic flowchart of determining a static state of a vehicle based on a target mesh plane figure according to an embodiment of this application. As shown in FIG. 11, the determining process of a static state of a vehicle may include step S401 to step S405.

S401. Obtain a Delaunay triangulation network from which abnormal matching feature points are removed.

Specifically, the computer device may obtain an image frame group $G_i$ in N image frame groups, and further obtain a target mesh plane figure $H_i$ corresponding to the image frame group $G_i$, where the target mesh plane figure $H_i$ includes M polygons, M is a positive integer, and i is a positive integer less than or equal to N. In this embodiment of this application, the target mesh plane figure $H_i$ may refer to a Delaunay triangulation network from which abnormal matching feature points are removed and corresponding to the image frame group $G_i$ (for ease of description, the "Delaunay triangulation network from which abnormal matching feature points are removed and corresponding to the image frame group $G_i$" is referred to as a "Delaunay triangulation network corresponding to the image frame group $G_i$"). The image frame group $G_i$ may include an image frame $T_i$ and an image frame $T_{i+1}$, the Delaunay triangulation network corresponding to the image frame group $G_i$ may include M triangles, and a minimum value of i is 1 and a maximum value thereof is N. For ease of description, the following describes the determining process of a static state of a vehicle by using the Delaunay triangulation network corresponding to the image frame group $G_i$ as an example.

S402: Calculate average coordinate change values of each triangle in the Delaunay triangulation network in a U-axis direction and a V-axis direction.

Specifically, the computer device may obtain image coordinate information of all matching feature points included in the Delaunay triangulation network in the image frame $T_i$ and the image frame $T_{i+1}$ respectively, that is, image coordinate information of vertexes of each triangle in the Delaunay triangulation network in the image frame $T_i$ and the image frame $T_{i+1}$. Further, the computer device may obtain average coordinate change values respectively corresponding to the M triangles in the Delaunay triangulation network (namely, the polygon in this embodiment of this application is a triangle) according to the image coordinate information of the vertexes of each triangle in the image frame $T_i$ and the image frame $T_{i+1}$, where the average coordinate change value herein may include average coordinate change values in a U-axis direction and in a V-axis direction in an image coordinate system.

The Delaunay triangulation network corresponding to the image frame group $G_i$ may be shown in the following formula (8):

$$\Psi = \{\Delta_{D_{s1}}, \Delta_{D_{s2}}, \ldots, \Delta_{D_{sM}}\} \quad (8)$$

$\Psi$ may represent the Delaunay triangulation network (namely, the Delaunay triangulation network from which abnormal matching feature points are removed) corresponding to the image frame group $G_i$, $\Delta_{D_{s1}}$ may represent a first triangle in the Delaunay triangulation network, and $\Delta_{D_{sM}}$ may represent an $M^{th}$ triangle in the Delaunay triangulation network. Image coordinate information of three vertexes (one vertex corresponds to one normal matching feature point) of any triangle $\Delta_{D_{Sj}}$, $j=1, 2, \ldots, M$ in the Delaunay triangulation network in the image frame $T_i$ may be shown in the following formula (9):

$$\left\{ \begin{bmatrix} u^i_{D_{sj,1}} \\ v^i_{D_{sj,1}} \end{bmatrix}, \begin{bmatrix} u^i_{D_{sj,2}} \\ v^i_{D_{sj,2}} \end{bmatrix}, \begin{bmatrix} u^i_{D_{sj,3}} \\ v^i_{D_{sj,3}} \end{bmatrix} \right\} \quad (9)$$

$u^i_{D_{sj,1}}$, $u^i_{D_{sj,2}}$, and $u^i_{D_{sj,3}}$ may represent coordinates of the three vertexes of the triangle $\Delta_{D_{Sj}}$ on the axis U in the image frame $T_i$ respectively, and $v^i_{D_{sj,1}}$, $v^i_{D_{sj,2}}$, and $v^i_{D_{sj,3}}$ may represent coordinates of the three vertexes of the triangle $\Delta_{D_{Sj}}$ on the axis V in the image frame $T_i$ respectively.

Image coordinate information of the three vertexes of the triangle $\Delta_{D_{Sj}}$ in the image frame $T_{i+1}$ may be shown in the following formula (10):

$$\left\{ \begin{bmatrix} u^{i+1}_{D_{sj,1}} \\ v^{i+1}_{D_{sj,1}} \end{bmatrix}, \begin{bmatrix} u^{i+1}_{D_{sj,2}} \\ v^{i+1}_{D_{sj,2}} \end{bmatrix}, \begin{bmatrix} u^{i+1}_{D_{sj,3}} \\ v^{i+1}_{D_{sj,3}} \end{bmatrix} \right\} \quad (10)$$

$u^{i+1}_{D_{sj,1}}$, $u^{i+1}_{D_{sj,2}}$, and $u^{i+1}_{D_{sj,3}}$ may represent coordinates of the three vertexes of the triangle $\Delta_{D_{Sj}}$ on the axis U in the image frame $T_i+1$ respectively, and $v^{i+1}_{D_{sj,1}}$, $v^{i+1}_{D_{sj,2}}$ and $v^{i+1}_{D_{sj,3}}$ may represent coordinates of the three vertexes of the triangle $\Delta_{D_{Sj}}$ on the axis V in the image frame $T_{i+1}$ respectively.

An average coordinate change value $d_{u,sj}$ of the $\Delta_{D_{Sj}}$ in the U-axis direction is shown in the following formula (11):

$$d_{u,sj} = \frac{u^{i+1}_{D_{sj,1}} - u^i_{D_{sj,1}} + u^{i+1}_{D_{sj,2}} - u^i_{D_{sj,2}} + u^{i+1}_{D_{sj,3}} - u^i_{D_{sj,3}}}{3} \quad (11)$$

An average coordinate change value $d_{v,sj}$ of the triangle $\Delta_{D_{Sj}}$ in the V-axis direction is shown in the following formula (12):

$$d_{v,sj} = \frac{v^{i+1}_{D_{sj,1}} - v^i_{D_{sj,1}} + v^{i+1}_{D_{sj,2}} - v^i_{D_{sj,2}} + v^{i+1}_{D_{sj,3}} - v^i_{D_{sj,3}}}{3} \quad (12)$$

S403. Combine average coordinate change values of all triangles in the Delaunay triangulation network in the U-axis direction and in the V-axis direction into two sequences.

Specifically, the computer device may form a sequence of the Delaunay triangulation network in the U-axis direction according to average coordinate change values of the M triangles in the Delaunay triangulation network in the U-axis direction, and the sequence may be shown in the following formula (13):

$$\Phi_u = \{d_{u,s1}, d_{u,s2}, \ldots, d_{u,sM}\} \quad (13)$$

Further, the computer device may form a sequence of the Delaunay triangulation network in the V-axis direction according to average coordinate change values of the M triangles in the Delaunay triangulation network in the V-axis direction, and the sequence may be shown in the following formula (14):

$$\Phi_v = \{d_{v,s1}, d_{v,s2}, \ldots, d_{v,sM}\} \quad (14)$$

S404. Process the two sequences, and obtain average values, medians, and standard deviation values respectively corresponding to the two sequences.

Specifically, the computer device may process a sequence $\Phi_u$ and a sequence $\Phi_v$ to obtain statistical values associated with the Delaunay triangulation network. In this case, the statistical values may include an average value, a median, and a standard deviation value calculated according to the sequence $\Phi_u$ and an average value, a median, and a standard deviation value calculated according to the sequence $\Phi_v$. The average values corresponding to the sequence $\Phi_u$ and the sequence $\Phi_v$ may be referred to as coordinate average values, the medians corresponding to the sequence $\Phi_u$ and the sequence $\Phi_v$ may be referred to as coordinate medians, and the standard deviation values corresponding to the sequence $\Phi_u$ and the sequence $\Phi_v$ may be referred to as coordinate standard deviation values. For a specific calculation process of the statistical values, reference may be made to the description in the following embodiment corresponding to FIG. 12.

S405. Determine that the current vehicle is in a static state when the average values, the medians, and the standard deviation values of the two sequences are all less than a given threshold.

Specifically, a target mesh plane figure may be constructed for each image frame group, namely, N Delaunay triangulation networks may be obtained according to normal matching feature points respectively corresponding to the N image frame groups, one Delaunay triangulation network may correspond to one sequence $\Phi_u$ and one sequence $\Phi_v$, and when statistical values respectively associated with the N Delaunay triangulation networks are all less than a first threshold, it may be determined that the motion state of the vehicle is a static state. It may be understood that, the first threshold herein may include a first average value threshold, a first median threshold, and a standard deviation value threshold, and the first average value threshold, the first median threshold, and the standard deviation value threshold may be different preset values.

In the embodiments of this application, in-vehicle image data corresponding to a vehicle is obtained, matching feature points between two adjacent image frames are extracted, a Delaunay triangulation network corresponding to the two adjacent image frames is constructed by using the matching feature points between the two adjacent image frames, and abnormal matching feature points are removed based on the Delaunay triangulation network. Therefore, the effectiveness of the matching feature points may be improved, and determining a motion state of the vehicle based on the Delaunay triangulation network may not only improve the evaluation accuracy of the motion state of the vehicle, but may also simplify the evaluation procedure of the static state of the vehicle, thereby further improving the evaluation efficiency of the motion state of the vehicle.

Further, referring to FIG. 12, FIG. 12 is a schematic flowchart of determining a static state of a vehicle based on a target mesh plane figure according to an embodiment of this application. In a possible implementation, the process of evaluating the static state of the vehicle according to the target mesh plane figures respectively corresponding to the N image frame groups may include that: the computer device may obtain a target mesh plane figure $H_i$ corresponding to an image frame group $G_i$ in the N image frame groups, where the target mesh plane figure $H_i$ may include M polygons. Further, the computer device may obtain average coordinate change values respectively corresponding to the M polygons, sort the average coordinate change values respectively corresponding to the M polygons, determine the sorted average coordinate change values as a first coordinate sequence of the target mesh plane figure $H_i$, and determine statistical values associated with the target mesh plane figure $H_i$ according to the first coordinate sequence; and determine the motion state of the vehicle as a static state when statistical values respectively associated with N target mesh plane figures are all less than a first threshold.

The first coordinate sequence may include a sequence of the target mesh plane figure $H_i$ in the U-axis direction (for example, a sequence obtained by sorting average coordinate change values included in a first sequence below in ascending order) and a sequence of the target mesh plane figure $H_i$ in the V-axis direction (for example, a sequence obtained by sorting average coordinate change values included in a second sequence below in ascending order). The statistical values may include a coordinate average value, a coordinate median, and a coordinate standard deviation value, where the coordinate average value may include an average value corresponding to the sequence in the U-axis direction and an average value corresponding to the sequence in the V-axis direction, the coordinate median may include a median corresponding to the sequence in the U-axis direction and a median corresponding to the sequence in the V-axis direction, and the coordinate standard deviation value may include a standard deviation value corresponding to the sequence in the U-axis direction and a standard deviation value corresponding to the sequence in the V-axis direction. The first threshold may include a first average value threshold, a first median threshold, and a standard deviation value threshold adopting different values.

Processing processes of the sequence in the U-axis direction and the sequence in the V-axis direction are similar (as shown in FIG. 12), and for any sequence in a coordinate axis direction of an image coordinate system, a determining process of statistical values thereof may include that: the computer device may update the first coordinate sequence according to a median corresponding to the first coordinate sequence and the average coordinate change values included in the first coordinate sequence to obtain a second coordinate sequence. Further, the computer device may determine an effective value range of element values included in the second coordinate sequence according to a lower quartile corresponding to the second coordinate sequence and an upper quartile corresponding to the second coordinate sequence, and determine element values falling within the effective value range in the second coordinate sequence as a third coordinate sequence. The computer device may obtain an initial tagged array corresponding to the first coordinate sequence, and update the initial tagged array according to a lower quartile corresponding to the first coordinate sequence, an upper quartile corresponding to the first coordinate sequence, and a median corresponding to the third coordinate sequence to obtain a target tagged array. Further, the computer device may filter the average coordinate change values included in the first coordinate sequence according to a non-zero element in the target tagged array to update the first coordinate sequence to a fourth coordinate sequence, and obtain a coordinate average value, a coordinate median, and a coordinate standard deviation value corresponding to the fourth coordinate sequence.

As shown in FIG. 12, when the target mesh plane figure $H_i$ is a Delaunay triangulation network corresponding to the image frame group $G_i$, the determining process (or may be referred to as an evaluation process) of a static state of a vehicle may include step S1201 to step S1223.

S1201. Obtain a Delaunay triangulation network from which abnormal matching feature points are removed.

S1202. Calculate average coordinate change values of each triangle in the Delaunay triangulation network in a U-axis direction and a V-axis direction.

For a specific implementation of step S1201 and step S1202, reference may be made to step S401 and step S402 in the embodiment corresponding to FIG. 11, and details are not described herein again.

S1203. Combine the average coordinate change value of each triangle in the U-axis direction into a first sequence.

Specifically, the computer device may form a sequence of the Delaunay triangulation network in the U-axis direction according to average coordinate change values of M triangles in the Delaunay triangulation network in the U-axis direction. In this case, the sequence may be referred to as a first sequence, and the first sequence is presented as the foregoing formula (13).

S1204. Sort elements of the first sequence in ascending order.

Specifically, the first sequence may include the average coordinate change values of the M triangles of the Delaunay triangulation network in the U-axis direction respectively, and a first coordinate sequence in the U-axis direction may be obtained by sorting the average coordinate change values included in the first sequence in ascending order, where the first coordinate sequence in the U-axis direction may be shown in the following formula (15):

$$\Phi_u^{sort} = \{d_{u,S1}, d_{u,S2}, \ldots, d_{u,SM}\} \quad (15)$$

$\Phi_u^{sort}$ may represent the first coordinate sequence in the U-axis direction of the Delaunay triangulation network corresponding to the image frame group $G_i$, $d_{u,S1}$ may be a minimum average coordinate change value in the first coordinate sequence $\Phi_u^{sort}$ ort and $d_{u,SM}$ may be a maximum average coordinate change value in the first coordinate sequence $\Phi_u^{sort}$.

S1205. Initialize a first tagged array.

Specifically, an initial tagged array corresponding to the first coordinate sequence in the U-axis direction is obtained. In this case, the initial tagged array may refer to an initialized first tagged array, and the initial tagged array may be set to:

$$\text{mask}[M] = \{0, 0, \ldots, 0\} \quad (16)$$

The initial tagged array mask[M] may be an array including M elements, namely, the number of elements in the initial tagged array mask[M] is the same as the number of triangles included in the Delaunay triangulation network.

S1206. Calculate an upper quartile, a lower quartile, and a median of the sorted first sequence.

Specifically, the sorted first sequence may be referred to as the first coordinate sequence $\Phi_u^{sort}$ of the M triangles in the U-axis direction, and the computer device may calculate an upper quartile, a lower quartile, and a median of the first coordinate sequence $\Phi_u^{sort}$ in the U-axis direction. The upper quartile may refer to an average coordinate change value at a 75% position in the first coordinate sequence $\Phi_u^{sort}$ in the U-axis direction, the lower quartile may refer to an average coordinate change value at a 25% position in the first coordinate sequence $\Phi_u^{sort}$ in the U-axis direction, and the median may refer to an average coordinate change value at a 50% position in the first coordinate sequence $\Phi_u^{sort}$ in the U-axis direction.

When the computer device calculates the lower quartile of the first coordinate sequence $\Phi_u^{sort}$ in the U-axis direction, if (M+1)/4 is an integer, the lower quartile may be represented as $$M_{1/4} = \Phi_u^{sort}\left[\frac{M+1}{4}\right],$$

and if (M+1)/4 is not an integer, the lower quartile may be represented as:

$$M_{1/4} = \Phi_u^{sort}\left[Int\left(\frac{M+1}{4}\right)\right]\cdot\left(1-Dec\left(\frac{M+1}{4}\right)\right)+ \qquad (17)$$
$$\Phi_u^{sort}\left[Int\left(\frac{M+1}{4}\right)+1\right]\cdot Dec\left(\frac{M+1}{4}\right)$$

Int in formula (17) represents an integer calculation operation, and Dec represents a decimal calculation operation.

When the computer device calculates the upper quartile of the first coordinate sequence $\Phi_u^{sort}$ r in the U-axis direction, if 3(M+1)/4 is an integer, the upper quartile may be represented as $$M_{3/4} = \Phi_u^{sort}\left[\frac{M+1}{4}\cdot 3\right],$$

and if 3(M+1)/4 is not an integer, the upper quartile may be represented as:

$$M_{3/4} = \Phi_u^{sort}\left[Int\left(\frac{M+1}{4}\cdot 3\right)\right]\cdot\left(1-Dec\left(\frac{M+1}{4}\cdot 3\right)\right)+ \qquad (18)$$
$$\Phi_u^{sort}\left[Int\left(\frac{M+1}{4}\cdot 3\right)+1\right]\cdot Dec\left(\frac{M+1}{4}\cdot 3\right)$$

When the computer device calculates the median of the first coordinate sequence $\Phi_u^{sort}$ in the U-axis direction, if (M+1)/2 is an integer, the median may be represented as $$M_{2/4} = \Phi_u^{sort}\left[\frac{M+1}{2}\right],$$

and if (M+1)/2 is not an integer, the median may be represented as:

$$M_{2/4} = \Phi_u^{sort}\left[Int\left(\frac{M+1}{2}\right)\right]\cdot 0.5 + \Phi_u^{sort}\left[Int\left(\frac{M+1}{2}\right)+1\right]\cdot 0.5 \qquad (19)$$

S1207. Update the first tagged array.

Specifically, after the upper quartile $M_{3/4}$ and the lower quartile $M_{1/4}$ corresponding to the first coordinate sequence $\Phi_u^{sort}$ in the U-axis direction are calculated, the computer device may perform gross error detection on the first coordinate sequence $\Phi_u^{sort}$ in the U-axis direction according to the upper quartile $M_{3/4}$ and the lower quartile $M_{1/4}$, namely, perform the following processing on each element (average coordinate change value) included in the first coordinate sequence $\Phi_u^{sort}$ in the U-axis direction: when $d_{u,Sj}<M_{1/4}-1.5\cdot(M_{3/4}-M_{1/4})$ or $d_{u,Sj}>M_{3/4}+1.5\cdot(M_{3/4}-M_{1/4})$, mask[j]=mask[j]+1; or otherwise, no processing is performed, where j is a positive integer less than M, and this operation is a process of updating and processing the first tagged array (the initial tagged array). The gross error may refer to a gross error, which is an error greater than a maximum error that is likely to occur in a normal observation condition, and the gross error may be an error caused by carelessness of a staff member or equipment failure.

S1208. Process the sorted first sequence to obtain a new sequence.

Specifically, the computer device may update the first coordinate sequence $\Phi_u^{sort}$ in the U-axis direction according to the median $M_{1/2}$ of the first coordinate sequence $\Phi_u^{sort}$ in the U-axis direction to obtain a new sequence. In this case, the new sequence may be referred to as a second coordinate sequence $\overline{\Phi}_u^{sort}$ in the U-axis direction, and the second coordinate sequence $\overline{\Phi}_u^{sort}$ in the U-axis direction may be represented as:

$$\overline{\Phi}_u^{sort}=\{|d_{u,S1}-M_{2/4}|,|d_{u,S2}-M_{2/4}|,\ldots,|d_{u,SM}-M_{2/4}|\} \qquad (20)$$

S1209. Calculate an upper quartile, a lower quartile, and a median of the new sequence.

Specifically, the computer device may calculate a lower quartile, an upper quartile, and a median corresponding to the second coordinate sequence $\overline{\Phi}_u^{sort}$ in the U-axis direction, a calculation process thereof is similar to the calculation process of the lower quartile $M_{1/4}$, the upper quartile $M_{3/4}$, and the median $M_{2/4}$ of the first coordinate sequence $\Phi_u^{sort}$ in the U-axis direction, and details are not described herein again. The lower quartile of the second coordinate sequence $\overline{\Phi}_u^{sort}$ in the U-axis direction may be represented as $\overline{M}_{1/4}$, the upper quartile of the second coordinate sequence $\overline{\Phi}_u^{sort}$ in the U-axis direction may be represented as $\overline{M}_{3/4}$, and the median of the second coordinate sequence $\overline{\Phi}_u^{sort}$ in the U-axis direction may be represented as $\overline{M}_{2/4}$.

Further, the computer device may determine an effective value range of element values included in the second coordinate sequence $\overline{\Phi}_u^{sort}$ in the U-axis direction according to the lower quartile $\overline{M}_{1/4}$ and the upper quartile $\overline{M}_{3/4}$ corresponding to the second coordinate sequence $\overline{\Phi}_u^{sort}$ in the U-axis direction, and determine element values falling within the effective value range in the second coordinate sequence $\overline{\Phi}_u^{sort}$ in the U-axis direction as a third coordinate sequence $\overline{\Phi}_u^{sort}$ in the U-axis direction. In other words, when $\overline{M}_{1/4}-1.5\cdot(\overline{M}_{3/4}-\overline{M}_{1/4})<\overline{\Phi}_u^{sort}[j]<\overline{M}_{3/4}+1.5\cdot(\overline{M}_{3/4}-\overline{M}_{1/4})$, an element $\overline{\Phi}_u^{sort}[j]$ is added to the third coordinate sequence $\overline{\Phi}_u^{sort}$ in the U-axis direction.

The computer device may further calculate a median $\overline{M}_{2/4}$ corresponding to the third coordinate sequence $\overline{\Phi}_u^{sort}$ in the U-axis direction, and a calculation process of the median $\overline{M}_{2/4}$ is similar to the calculation process of the median $M_{2/4}$ of the first coordinate sequence $\Phi_u^{sort}$ in the U-axis direction.

S1210. Update the first tagged array.

Specifically, the computer device may update the first tagged array again according to the median $\overline{M}_{2/4}$ corresponding to the third coordinate sequence $\overline{\Phi}_u^{sort}$ in the U-axis direction, namely, may perform the following processing on each element (average coordinate change value) included in the first coordinate sequence $\Phi_u^{sort}$ in the U-axis direction: when $$\frac{|d_{u,sj} - \overline{M}_{2/4}|}{1.4826 \cdot \overline{M}_{2/4}} > 3.0,$$

mask[j]=mask[j]+1; or otherwise, no processing is performed. This operation is a process of updating and processing the updated first tagged array again, and an updated first tagged array may be obtained after this operation.

S1211. Remove a gross error in the first sequence according to the first tagged array.

Specifically, the computer device may remove an average coordinate change value included in the first coordinate sequence $\Phi_u^{sort}$ in the U-axis direction according to the first tagged array mask[M] obtained through step S1210, and if mask[j]≥1, an average coordinate change value $d_{u,Sj}$ in the first coordinate sequence $\Phi_u^{sort}$ is removed, and the average coordinate change value $d_{u,Sj}$ in this case may be referred to as a gross error in the first coordinate sequence. If mask[j]=0, the average coordinate change value $d_{u,Sj}$ in the first coordinate sequence $\Phi_u^{sort}$ is reserved, and the first coordinate sequence from which the gross error is removed is determined as a fourth coordinate sequence $\tilde{\Phi}_u$ in the U-axis direction of the Delaunay triangulation network.

S1212. Calculate an average value, a median, and a standard deviation value of the first sequence from which the gross error is removed.

Specifically, the computer device may obtain an average value $Avg_u$, a median $Med_u$, and a standard deviation value $STD_u$ of the fourth coordinate sequence $\tilde{\Phi}_u$ in the U-axis direction according to element values included in the fourth coordinate sequence $\tilde{\Phi}_u$ in the U-axis direction. In this case, the average value $Avg_u$, the median $Med_u$, and the standard deviation value $STD_u$ may be referred to as statistical values of the Delaunay triangulation network in the U-axis direction.

S1213. Combine the average coordinate change value of each triangle in the V-axis direction into a second sequence.

Specifically, the computer device may form a sequence of the Delaunay triangulation network in the V-axis direction according to average coordinate change values of the M triangles in the Delaunay triangulation network in the V-axis direction. In this case, the sequence may be referred to as a second sequence, and the second sequence is presented as the foregoing formula (14).

S1214. Sort elements of the second sequence in ascending order.

Specifically, the second sequence may include the average coordinate change values of the M triangles of the Delaunay triangulation network in the V-axis direction respectively, and a first coordinate sequence in the V-axis direction may be obtained by sorting the average coordinate change values included in the second sequence in ascending order, where the first coordinate sequence in the V-axis direction may be shown in the following formula (21):

$$\Phi_v^{sort} = \{d_{v,S1}, d_{v,S2}, \ldots, d_{v,SM}\} \quad (21)$$

$\Phi_v^{sort}$ may represent the first coordinate sequence in the V-axis direction of the Delaunay triangulation network corresponding to the image frame group $G_i$, $d_{v,S1}$ may be a minimum average coordinate change value in the first coordinate sequence $\Phi_v^{sort}$ and $d_{v,SM}$ may be a maximum average coordinate change value in the first coordinate sequence $\Phi_v^{sort}$.

S1215. Initialize a second tagged array.

Specifically, an initial tagged array corresponding to the first coordinate sequence in the V-axis direction and the initial tagged array corresponding to the first coordinate sequence in the U-axis direction are the same, namely, an initialized second tagged array and the initialized first tagged array are the same, the initialized second tagged array may be shown in the foregoing formula (16), and the second tagged array may also be an array including M elements.

S1216. Calculate an upper quartile, a lower quartile, and a median of the sorted second sequence.

S1217. Update the second tagged array.

S1218. Process the second sequence to obtain a new sequence.

S1219. Calculate an upper quartile, a lower quartile, and a median of the new sequence.

S1220. Update the second tagged array.

S1221. Remove a gross error in the second sequence according to the second tagged array.

S1222. Calculate an average value, a median, and a standard deviation value of the second sequence from which the gross error is removed.

Specifically, the computer device may process the first coordinate sequence $\Phi_v^{sort}$ in the V-axis direction according to step S1216 to step S1222, for a processing process of the first coordinate sequence $\Phi_v^{sort}$, reference may be made to the processing process of the first coordinate sequence $\Phi_u^{sort}$ in the U-axis direction in step S1206 to step S1212, and details are not described herein again. The processing process of the first coordinate sequence $\Phi_v^{sort}$ in the V-axis direction is similar to that of the first coordinate sequence $\Phi_u^{sort}$ in the U-axis direction, namely, in the processing processes, processed objects are different, but processing manners are the same. Based on step S1206 to step S1212, a fourth coordinate sequence $\tilde{\Phi}_v$ of the Delaunay triangulation network in the V-axis direction may be obtained. Further, an average value $Avg_v$, a median $Med_v$, and a standard deviation value $STD_v$ of the fourth coordinate sequence $\tilde{\Phi}_v$ in the V-axis direction may be obtained according to element values included in the fourth coordinate sequence $\tilde{\Phi}_v$ in the V-axis direction. In this case, the average value $Avg_v$, the median $Med_v$, and the standard deviation value $STD_v$ may be referred to as statistical values of the Delaunay triangulation network in the V-axis direction. The average value $Avg_u$, the median $Med_u$, the standard deviation value $STD_u$, the average value $Avg_v$, the median $Med_v$, and the standard deviation value $STD_v$ may be referred to as statistical values of the Delaunay triangulation network corresponding to the image frame group $G_i$.

S1223. Determine that the vehicle is in a static state when the average values, the medians, and the standard deviation values of the two sequences are all less than a given threshold; or otherwise, determine that the vehicle is in a non-static state.

Specifically, according to the foregoing step S1201 to step S1222, the computer device may obtain statistical values respectively corresponding to the N Delaunay triangulation networks. That is, each Delaunay triangulation network may be associated with the average value $Avg_u$, the median $Med_u$, and the standard deviation value $STD_u$ in the U-axis direction and the average value $Avg_v$, the median $Med_v$, and the standard deviation value $STD_v$ in the V-axis direction. When the statistical values respectively associated with the N Delaunay triangulation networks are all less than a given threshold (namely, the first threshold), it may be determined that the motion state of the vehicle is a static state; and when a statistical value in the statistical values respectively associated with the N Delaunay triangulation networks is greater than or equal to the given threshold (namely, the first threshold), it may be determined that the motion state of the vehicle is a non-static state.

In some embodiments, when the first threshold may include a first average value threshold, a first median threshold, and a standard deviation value threshold adopting different values, if the average values (including the average values $Avg_u$ and the average values $Avg_v$) respectively associated with the N Delaunay triangulation networks are all less than the first average value threshold, the medians (including the medians $Med_u$ and the medians $Med_v$) respectively associated with the N Delaunay triangulation networks are all less than the first median threshold, and the standard deviation values (including the standard deviation values $STD_u$ and the standard deviation values $STD_v$) respectively associated with the N Delaunay triangulation networks are all less than the standard deviation value threshold, it may be determined that the motion state of the vehicle is a static state; or otherwise, it may be determined that the motion state of the vehicle is a non-static state.

In the embodiments of this application, in-vehicle image data corresponding to a vehicle is obtained, matching feature points between two adjacent image frames are extracted, a Delaunay triangulation network corresponding to the two adjacent image frames is constructed by using the matching feature points between the two adjacent image frames, and abnormal matching feature points are removed based on the Delaunay triangulation network. Therefore, the effectiveness of the matching feature points may be improved, and determining a motion state of the vehicle based on the Delaunay triangulation network may not only improve the evaluation accuracy of the motion state of the vehicle, but may also simplify the evaluation procedure of the static state of the vehicle, thereby further improving the evaluation efficiency of the motion state of the vehicle. The motion state of the vehicle is evaluated based on the in-vehicle image data and the Delaunay triangulation network, so that limitations to a scenario in which the vehicle is located may be reduced, thereby effectively improving the evaluation accuracy of the motion state of the vehicle in a complex scenario (such as city overpass) and further improving the applicability of the method for evaluating a motion state of a vehicle.

Figure 13:
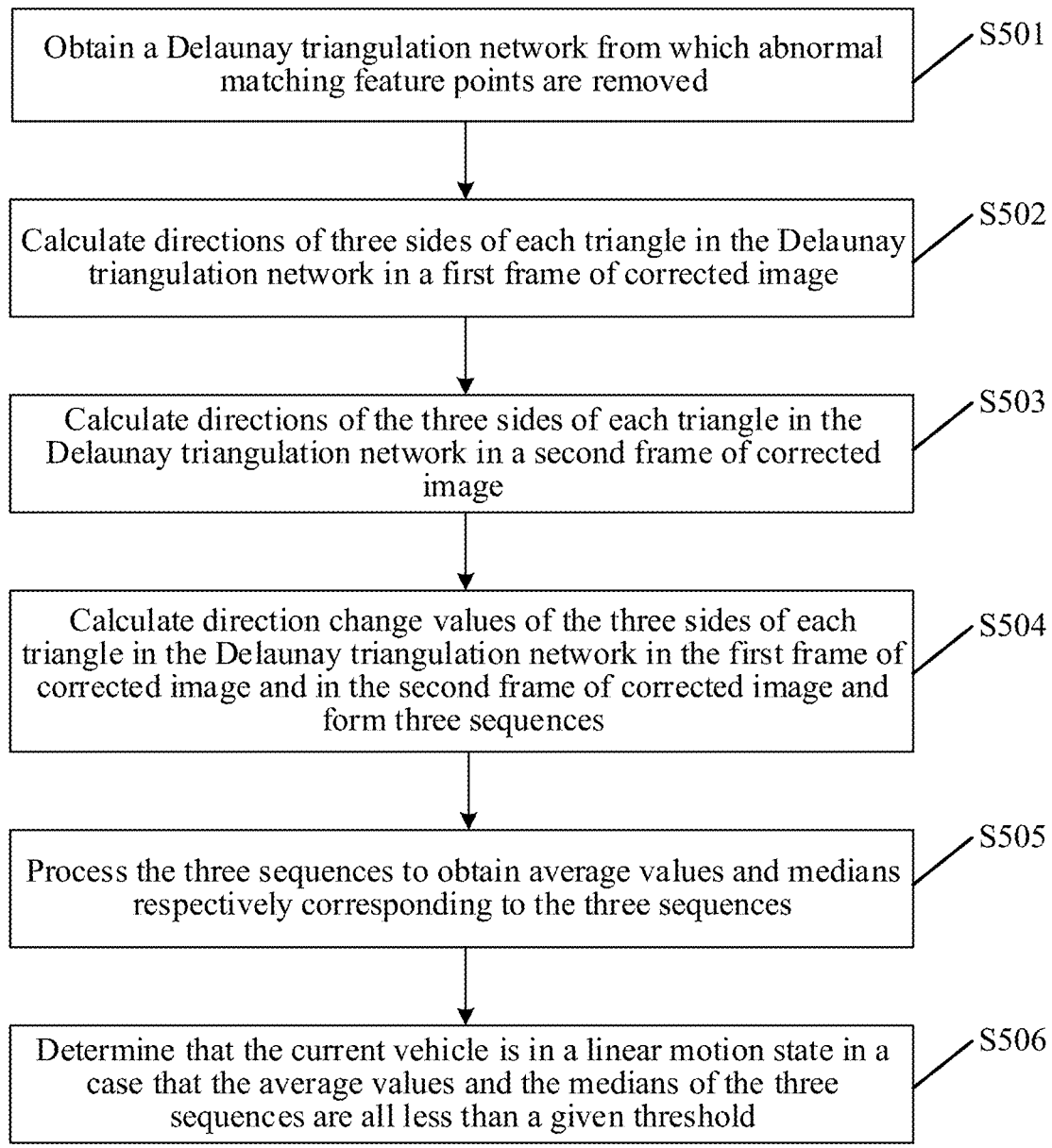
FIG. 13 is a schematic flowchart of determining a linear motion state based on a target mesh plane figure according to an embodiment of this application.

Referring to FIG. 13, FIG. 13 is a schematic flowchart of determining a linear motion state based on a target mesh plane figure according to an embodiment of this application. In some feasible implementations, the process of evaluating the linear motion state of the vehicle according to the target mesh plane figures respectively corresponding to the N image frame groups may include that: the computer device may obtain a target mesh plane figure $H_i$ corresponding to an image frame group $G_i$ in the N image frame groups, where the image frame group $G_i$ includes an image frame $T_i$ and an image frame $T_{i+1}$, the target mesh plane figure $H_i$ includes M polygons, M is a positive integer, and i is a positive integer less than or equal to N. Further, the computer device may obtain a first direction of each side of the M polygons in the image frame $T_i$ and a second direction of each side of the M polygons in the image frame $T_{i+1}$, determine a direction change value respectively corresponding to each side included in the M polygons according to the first direction and the second direction, further generate a direction change sequence associated with the M polygons according to the direction change value respectively corresponding to each side included in the M polygons, and determine a direction average value and a direction median associated with the target mesh plane figure $H_i$ according to the direction change sequence. When direction average values respectively associated with N target mesh plane figures and direction medians respectively associated with the N target mesh plane figures are all less than a second threshold, the motion state of the vehicle is determined as a linear motion state.

Any polygon in the M polygons may include a plurality of side lengths. For example, when the polygon is a triangle, the polygon may include three side lengths, in this case, the first direction may include directions of three sides in the image frame $T_i$ respectively, the second direction may include directions of the three sides in the image frame $T_{i+1}$ respectively, and the number of direction change sequences is 3 (for example, a third sequence, a fourth sequence, and a fifth sequence in the embodiment corresponding to FIG. 14). When the polygon is a quadrangle, the polygon may include four side lengths, in this case, the first direction may include directions of four sides in the image frame $T_i$ respectively, the second direction may include directions of the four sides in the image frame $T_{i+1}$ respectively, and the number of direction change sequences is 4. The second threshold may include a second average value threshold and a second median threshold, and the second average value threshold and the second median threshold may be different values.

As shown in FIG. 13, when the target mesh plane figure $H_i$ is a Delaunay triangulation network corresponding to the image frame group $G_i$, the determining process of a linear motion state of a vehicle may include step S501 to step S506.

S501. Obtain a Delaunay triangulation network from which abnormal matching feature points are removed.

For a specific implementation process of step S501, reference may be made to step S401 in the embodiment corresponding to FIG. 11, and details are not described herein again.

S502. Calculate directions of three sides of each triangle in the Delaunay triangulation network in the image frame $T_i$.

Specifically, the computer device may obtain image coordinate information of all matching feature points included in the Delaunay triangulation network in the image frame $T_i$, that is, image coordinate information of vertexes of each triangle in the Delaunay triangulation network in the image frame $T_i$, and the computer device may further obtain directions of three sides included in each triangle in the Delaunay triangulation network (namely, the polygon in this embodiment of this application is a triangle) in the image frame $T_i$ according to the image coordinate information of the vertexes of each triangle in the image frame $T_i$.

The Delaunay triangulation network corresponding to the image frame group $G_i$ may be shown in the foregoing formula (8), and the Delaunay triangulation network may include M triangles. Image coordinate information of three vertexes of any triangle $A_{Ds_j}$, j=1, 2, . . . , M in the M triangles in the image frame $T_i$ may be shown in the foregoing formula (9), and according to the foregoing formula (8) and formula (9), directions of three sides of the triangle $\Delta_{Ds_j}$ in the image frame $T_i$ may be represented as:

$$b_i^{Dsj,1} = \operatorname{atan}(u_{D_{sj,1}}^i - u_{D_{sj,2}}^i, v_{D_{sj,1}}^i - v_{D_{sj,2}}^i)$$

$$b_i^{Dsj,2} = \operatorname{atan}(u_{D_{sj,1}}^i - u_{D_{sj,3}}^i, v_{D_{sj,1}}^i - v_{D_{sj,3}}^i)$$

$$b_i^{Dsj,3} = \operatorname{atan}(u_{D_{sj,2}}^i - u_{D_{sj,3}}^i, v_{D_{sj,2}}^i - v_{D_{sj,3}}^i) \quad (22)$$

atan may represent an arc-tangent function, $b_i^{Dsj,1}$ may represent a direction of a first side of the triangle $\Delta_{Ds_j}$ in the image frame $T_i$, $b_i^{Dsj,2}$ may represent a direction of a second side of the triangle $\Delta_{Ds_j}$ in the image frame $T_i$, and $b_i^{Dsj,3}$ may represent a direction of a third side of the triangle $\Delta_{Ds_j}$ in the image frame $T_i$. In this case, $b_i^{Dsj,1}$, $b_i^{Dsj,2}$, and $b_i^{Dsj,3}$ may all be referred to as first directions of the triangle $\Delta_{Ds_j}$ in the image frame $T_i$.

S503. Calculate directions of the three sides of each triangle in the Delaunay triangulation network in the image frame $T_{i+1}$.

Specifically, the computer device may obtain image coordinate information of all the matching feature points included in the Delaunay triangulation network in the image frame $T_{i+1}$, that is, image coordinate information of the vertexes of each triangle in the Delaunay triangulation network in the image frame $T_{i+1}$, and the computer device may further obtain directions of the three sides included in each triangle in the Delaunay triangulation network in the image frame $T_{i+1}$ according to the image coordinate information of the vertexes of each triangle in the image frame $T_{i+1}$.

Image coordinate information of three vertexes of any triangle $\Delta_{Ds_j}$ in the M triangles in the image frame $T_{i+1}$ may be shown in the foregoing formula (10), and according to the foregoing formula (8) and formula (10), directions of three sides of the triangle $\Delta_{Ds_j}$ in the image frame $T_{i+1}$ may be represented as:

$$b_{i+1}^{Dsj,1} = \operatorname{atan}(u_{D_{sj,1}}^{i+1} - u_{D_{sj,2}}^{i+1}, v_{D_{sj,1}}^{i+1} - v_{D_{sj,2}}^{i+1})$$

$$b_{i+1}^{Dsj,2} = \operatorname{atan}(u_{D_{sj,1}}^{i+1} - u_{D_{sj,3}}^{i+1}, v_{D_{sj,1}}^{i+1} - v_{D_{sj,3}}^{i+1})$$

$$b_{i+1}^{Dsj,3} = \operatorname{atan}(u_{D_{sj,2}}^{i+1} - u_{D_{sj,3}}^{i+1}, v_{D_{sj,2}}^{i+1} - v_{D_{sj,3}}^{i+1}) \quad (23)$$

atan may represent an arc-tangent function, $b_{i+1}^{Dsj,1}$ may represent a direction of a first side of the triangle $\Delta_{Ds_j}$ in the image frame $T_{i+1}$, $b_{i+1}^{Dsj,2}$ may represent a direction of a second side of the triangle $\Delta_{Ds_j}$ in the image frame $T_{i+1}$, and $b_{i+1}^{Dsj,3}$ may represent a direction of a third side of the triangle $\Delta_{Ds_j}$ in the image frame $T_{i+1}$. In this case, $b_{i+1}^{Dsj,1}$, $b_{i+1}^{Dsj,2}$, and $b_{i+1}^{Dsj,3}$ may all be referred to as second directions of the triangle $\Delta_{Ds_j}$ in the image frame $T_{i+1}$.

S504. Calculate direction change values of the three sides of each triangle in the Delaunay triangulation network in the image frame $T_i$ and in the image frame $T_{i+1}$ and form three sequences.

Specifically, The computer device may calculate direction change values of the three sides of the triangle $\Delta_{Ds_j}$ between the image frame $T_i$ and the image frame $T_{i+1}$, and the direction change values of the three sides may be shown in the following formula (24):

$$db_{D_{sj}}^1 = b_{i+1}^{Dsj,1} - b_i^{Dsj,1}$$

$$db_{D_{sj}}^2 = b_{i+1}^{Dsj,2} - b_i^{Dsj,2}$$

$$db_{D_{sj}}^3 = b_{i+1}^{Dsj,3} - b_i^{Dsj,3} \quad (24)$$

$db_{D_{sj}}^1$ may represent a direction change value of the first side of the triangle $\Delta_{Ds_j}$ between the image frame $T_i$ and the image frame $T_{i+1}$, $db_{D_{sj}}^2$ may represent a direction change value of the second side of the triangle $\Delta_{Ds_j}$ between the image frame $T_i$ and the image frame $T_{i+1}$, and $db_{D_{sj}}^3$ may represent a direction change value of the third side of the triangle $\Delta_{Ds_j}$ between the image frame $T_i$ and the image frame $T_{i+1}$.

The computer device may obtain three direction change values respectively corresponding to the M triangles in the Delaunay triangulation network according to formula (22) to formula (24), and may further generate three sequences corresponding to the Delaunay triangulation network according to the three direction change values respectively corresponding to the M triangles, where the three sequences may be shown in the following formula (25):

$$\Omega^1 = \{db_{D_{s1}}^1, db_{D_{s2}}^1, \ldots, db_{D_{sM}}^1\}$$

$$\Omega^2 = \{db_{D_{s1}}^2, db_{D_{s2}}^2, \ldots, db_{D_{sM}}^2\}$$

$$\Omega^3 = \{db_{D_{s1}}^3, db_{D_{s2}}^3, \ldots, db_{D_{sM}}^3\} \quad (25)$$

$\Omega^1$, $\Omega^2$, and $\Omega^3$ may represent the three sequences corresponding to the Delaunay triangulation network. In this case, the three sequences may all be referred to as direction change sequences corresponding to the Delaunay triangulation network, and the three sequences include a third sequence $\Omega^1$, a fourth sequence $\Omega^2$, and a fifth sequence $\Omega^3$.

S505. Process the three sequences to obtain average values and medians respectively corresponding to the three sequences.

Specifically, the computer device may process the third sequence $\Omega^1$, the fourth sequence $\Omega^2$, and the fifth sequence $\Omega^3$ corresponding to the Delaunay triangulation network, to obtain an average value $Avg_1$ and a median $Med_1$ of the third sequence $\Omega^1$, an average value $Avg_2$ and a median $Med_2$ of the fourth sequence $\Omega^2$, and an average value $Avg_3$ and a median $Med_3$ of the fifth sequence $\Omega^3$. Further, the computer device may calculate an average value $Avg_b$ (the $Avg_b$ herein may be referred to as a direction average value) among the average value $Avg_1$, the average value $Avg_2$, and the average value $Avg_3$, and the average value $Avg_b$ may be represented as: $Avg_b = (Avg_1 + Avg_2 + Avg_3)/3$. Further, the computer device may calculate an average value $Med_b$ (the $Med_b$ herein may be referred to as a direction median) among the median $Med_1$, the median $Med_2$, and the median $Med_3$, and the average value $Med_b$ may be represented as: $Med_b = (Med_1 + Med_2 + Med_3)/3$.

S506. Determine that the current vehicle is in a linear motion state when the average values and the medians of the three sequences are all less than a given threshold.

Specifically, a target mesh plane figure may be constructed for each image frame group, namely, N Delaunay triangulation networks may be obtained according to normal matching feature points respectively corresponding to the N image frame groups. One Delaunay triangulation network may correspond to one sequence $\Omega^1$, one sequence $\Omega^2$, and one sequence $\Omega^3$, and direction average values respectively associated with the N Delaunay triangulation networks and direction medians respectively associated with the N Delaunay triangulation networks may be further calculated. When the direction average values respectively associated with N Delaunay triangulation networks and the direction medians respectively associated with the N Delaunay triangulation networks are all less than a second threshold (which may be a preset threshold), the motion state of the vehicle may be determined as a linear motion state. It may be understood that, the second threshold herein may include a second average value threshold and a second median threshold adopting different values.

In the embodiments of this application, in-vehicle image data corresponding to a vehicle is obtained, matching feature points between two adjacent image frames are extracted, a Delaunay triangulation network corresponding to the two adjacent image frames is constructed by using the matching feature points between the two adjacent image frames, and abnormal matching feature points are removed based on the Delaunay triangulation network. Therefore, the effectiveness of the matching feature points may be improved, and determining a motion state of the vehicle based on the Delaunay triangulation network may not only improve the evaluation accuracy of the motion state of the vehicle, but may also simplify the evaluation procedure of the linear motion state of the vehicle, thereby further improving the evaluation efficiency of the motion state of the vehicle.

Figure 14:
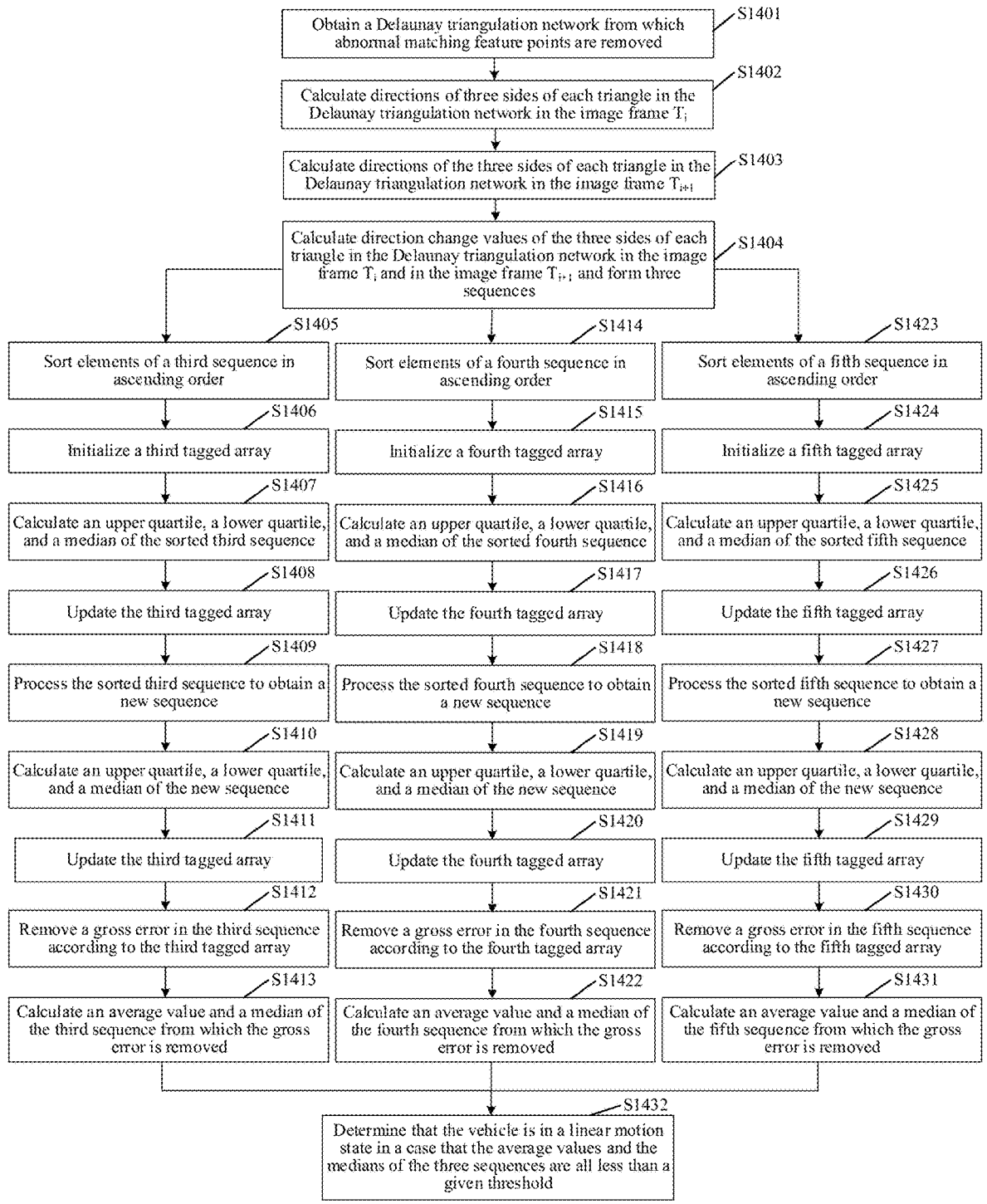
FIG. 14 is a schematic flowchart of determining a linear motion state based on a target mesh plane figure according to an embodiment of this application.

Further, referring to FIG. 14, FIG. 14 is a schematic flowchart of determining a linear motion state based on a target mesh plane figure according to an embodiment of this application. As shown in FIG. 14, the determining process of a linear motion state of a vehicle may include step S1401 to step S1432.

S1401. Obtain a Delaunay triangulation network from which abnormal matching feature points are removed.

S1402. Calculate directions of three sides of each triangle in the Delaunay triangulation network in the image frame $T_i$.

S1403. Calculate directions of the three sides of each triangle in the Delaunay triangulation network in the image frame $T_{i+1}$.

S1404. Calculate direction change values of the three sides of each triangle in the Delaunay triangulation network in the image frame $T_i$ and in the image frame $T_{i+1}$ and form three sequences.

For a specific implementation process of step S1401 to step S1404, reference may be made to step S501 to step S504 in the embodiment corresponding to FIG. 13, and details are not described herein again.

S1405. Sort elements of a third sequence in ascending order.

Specifically, the computer device may obtain a sorted third sequence $\Omega^1$ by sorting the direction change values included in the third sequence $\Omega^1$ in formula (25) in ascending order.

S1406. Initialize a third tagged array.

Specifically, the computer device may obtain an initial tagged array corresponding to the third sequence $\Omega^1$, where the initial tagged array may refer to an initialized third tagged array. When the Delaunay triangulation network includes M triangles, it may be determined that the initialized third tagged array and the initialized first tagged array in the embodiment corresponding to FIG. 12 are the same, namely, the initialized third tagged array is shown in formula (16).

S1407. Calculate an upper quartile, a lower quartile, and a median of the sorted third sequence.

S1408. Update the third tagged array.

S1409. Process the third sequence to obtain a new sequence.

S1410. Calculate an upper quartile, a lower quartile, and a median of the new sequence.

S1411. Update the third tagged array.

S1412. Remove a gross error in the third sequence according to the third tagged array.

S1413. Calculate an average value and a median of the third sequence from which the gross error is removed.

Specifically, the computer device may process the sorted third sequence $\Omega^1$ according to step S1407 to step S1413, for a processing process of the sorted third sequence $\Omega^1$, reference may be made to the processing process of the first coordinate sequence $\Phi_u^{sort}$ in the U-axis direction in step S1206 to step S1212, and details are not described herein again. The processing process of the sorted third sequence $\Omega^1$ is similar to that of the first coordinate sequence $\Phi_u^{sort}$ in the U-axis direction, namely, in the processing processes, processed objects are different, but processing manners are the same. Based on step S1407 to step S1413, a third sequence $\Omega^1$ from which a gross error is removed and corresponding to the Delaunay triangulation network may be obtained, and an average value $Avg_1$ and a median $Med_1$ of the third sequence $\Omega^1$ from which the gross error is removed may be further obtained according to element values included in the third sequence $\Omega^1$ from which the gross error is removed.

It may be understood that, in the processing process of the first coordinate sequence $\Phi_u^{sort}$ in the U-axis direction, the median, the average value, and the standard deviation value corresponding to the first coordinate sequence $\Phi_u^{sort}$ in the U-axis direction need to be finally obtained. However, in this embodiment of this application, only the average value and the median corresponding to third sequence $\Omega^1$ need to be finally obtained. In other words, factors for evaluating the static state of the vehicle may include an average value, a median, and a standard deviation value; and factors for evaluating the linear motion state of the vehicle may include an average value and a median.

S1414. Sort elements of a fourth sequence in ascending order.

Specifically, the computer device may obtain a sorted fourth sequence $\Omega^2$ by sorting the direction change values included in the fourth sequence $\Omega^2$ in formula (25) in ascending order.

S1415. Initialize a fourth tagged array.

Specifically, the computer device may obtain an initial tagged array corresponding to the fourth sequence $\Omega^2$, where the initial tagged array may refer to an initialized fourth tagged array. When the Delaunay triangulation network includes M triangles, it may be determined that the initialized fourth tagged array and the initialized first tagged array in the embodiment corresponding to FIG. 12 are the same, namely, the initialized fourth tagged array is shown in formula (16).

S1416. Calculate an upper quartile, a lower quartile, and a median of the sorted fourth sequence.

S1417. Update the fourth tagged array.

S1418. Process the fourth sequence to obtain a new sequence.

S1419. Calculate an upper quartile, a lower quartile, and a median of the new sequence.

S1420. Update the fourth tagged array.

S1421. Remove a gross error in the fourth sequence according to the fourth tagged array.

S1422. Calculate an average value and a median of the fourth sequence from which the gross error is removed.

Specifically, the computer device may process the sorted fourth sequence $\Omega^2$ according to step S1416 to step S1422, for a processing process of the sorted fourth sequence $\Omega^2$, reference may be made to the processing process of the first coordinate sequence $\Phi_u^{sort}$ in the U-axis direction in step S1206 to step S1212, and details are not described herein again. The processing process of the sorted fourth sequence $\Omega^2$ is similar to that of the first coordinate sequence $\Phi_u^{sort}$ in the U-axis direction, namely, in the processing processes, processed objects are different, but processing manners are the same. Based on step S1416 to step S1422, a fourth sequence $\Omega^2$ from which a gross error is removed and corresponding to the Delaunay triangulation network may be obtained, and an average value $Avg_2$ and a median $Med_2$ of the fourth sequence $\Omega^2$ from which the gross error is removed may be further obtained according to element values included in the fourth sequence $\Omega^2$ from which the gross error is removed.

It may be understood that, in the processing process of the first coordinate sequence $\Phi_u^{sort}$ in the U-axis direction, the median, the average value, and the standard deviation value corresponding to the first coordinate sequence $\Phi_u^{sort}$ in the U-axis direction need to be finally obtained. However, in this embodiment of this application, only the average value and the median corresponding to fourth sequence $\Omega^2$ need to be finally obtained.

S1423. Sort elements of a fifth sequence in ascending order.

Specifically, the computer device may obtain a sorted fifth sequence $\Omega^3$ by sorting the direction change values included in the fifth sequence $\Omega^3$ in formula (25) in ascending order.

S1424. Initialize a fifth tagged array.

Specifically, the computer device may obtain an initial tagged array corresponding to the fifth sequence $\Omega^3$, where the initial tagged array may refer to an initialized fifth tagged array. When the Delaunay triangulation network includes M triangles, it may be determined that the initialized fifth tagged array and the initialized first tagged array in the embodiment corresponding to FIG. 12 are the same, namely, the initialized fifth tagged array is shown in formula (16).

S1425. Calculate an upper quartile, a lower quartile, and a median of the sorted fifth sequence.

S1426. Update the fifth tagged array.

S1427. Process the fifth sequence to obtain a new sequence.

S1428. Calculate an upper quartile, a lower quartile, and a median of the new sequence.

S1429. Update the fifth tagged array.

S1430. Remove a gross error in the fifth sequence according to the fifth tagged array.

S1431. Calculate an average value and a median of the fifth sequence from which the gross error is removed.

Specifically, the computer device may process the sorted fifth sequence S3 according to step S1425 to step S1431, for a processing process of the sorted fifth sequence $\Omega^3$, reference may be made to the processing process of the first coordinate sequence $\Phi_u^{sort}$ in the U-axis direction in step S1206 to step S1212, and details are not described herein again. The processing process of the sorted fifth sequence $\Omega^3$ is similar to that of the first coordinate sequence $\Phi_u^{sort}$ in the U-axis direction, namely, in the processing processes, processed objects are different, but processing manners are the same. Based on step S1425 to step S1431, a fifth sequence $\Omega^3$ from which a gross error is removed and corresponding to the Delaunay triangulation network may be obtained, and an average value $Avg_3$ and a median $Med_3$ of the fifth sequence $\Omega^3$ from which the gross error is removed may be further obtained according to element values included in the fifth sequence $\Omega^3$ from which the gross error is removed.

It may be understood that, in the processing process of the first coordinate sequence $\Phi_u^{sort}$ in the U-axis direction, the median, the average value, and the standard deviation value corresponding to the first coordinate sequence $\Phi_u^{sort}$ in the U-axis direction need to be finally obtained. However, in this embodiment of this application, only the average value and the median corresponding to fifth sequence $\Omega^3$ need to be finally obtained.

S1432. Determine that the vehicle is in a linear motion state when the average values and the medians of the three sequences are all less than a given threshold.

Specifically, after obtaining the average value $Avg_1$ and the median $Med_1$ of the third sequence $\Omega^1$, the average value $Avg_2$ and the median $Med_2$ of the fourth sequence $\Omega^2$, and the average value $Avg_3$ and the median $Med_3$ of the fifth sequence $\Omega^3$, the computer device may determine an average value of the average value $Avg_1$, the average value $Avg_2$, and the average value $Avg_3$ as a direction average value associated with the Delaunay triangulation network, and determine an average value of the median $Med_1$, the median $Med_2$, and the median $Med_3$ as a direction median associated with the Delaunay triangulation network. Based on the same processing process, the computer device may obtain direction average values respectively associated with N Delaunay triangulation networks and direction medians respectively associated with the N Delaunay triangulation networks. When the direction average values respectively associated with N Delaunay triangulation networks and the direction medians respectively associated with the N Delaunay triangulation networks are all less than a second threshold (which may be a preset threshold), the motion state of the vehicle may be determined as a linear motion state; and when a direction average value greater than or equal to the second threshold exists in the direction average values associated with the N Delaunay triangulation networks or a direction median greater than or equal to the second threshold exists in the direction medians associated with the N Delaunay triangulation networks, the motion state of the vehicle may be determined as a non-linear motion state.

In some embodiments, when the second threshold includes a second average value threshold and a second median value, when the direction average values respectively associated with the N Delaunay triangulation networks are all less than the second average value threshold, and the direction medians respectively associated with the N Delaunay triangulation networks are all less than the second median threshold, the motion state of the vehicle is determined as a linear motion state; and when a direction average value greater than or equal to the second average value threshold exists in the direction average values associated with the N Delaunay triangulation networks or a direction median greater than or equal to the second median threshold exists in the direction medians associated with the N Delaunay triangulation networks, the motion state of the vehicle may be determined as a non-linear motion state.

In the embodiments of this application, in-vehicle image data corresponding to a vehicle is obtained, matching feature points between two adjacent image frames are extracted, a Delaunay triangulation network corresponding to the two adjacent image frames is constructed by using the matching feature points between the two adjacent image frames, and abnormal matching feature points are removed based on the Delaunay triangulation network. Therefore, the effectiveness of the matching feature points may be improved, and determining a motion state of the vehicle based on the Delaunay triangulation network may not only improve the evaluation accuracy of the motion state of the vehicle, but may also simplify the evaluation procedure of the linear motion state of the vehicle, thereby further improving the evaluation efficiency of the motion state of the vehicle. The motion state of the vehicle is evaluated based on the in-vehicle image data and the Delaunay triangulation network, so that limitations to a scenario in which the vehicle is located may be reduced, thereby effectively improving the evaluation accuracy of the motion state of the vehicle in a complex scenario (such as city overpass) and further improving the applicability of the method for evaluating a motion state of a vehicle.

Figure 15:
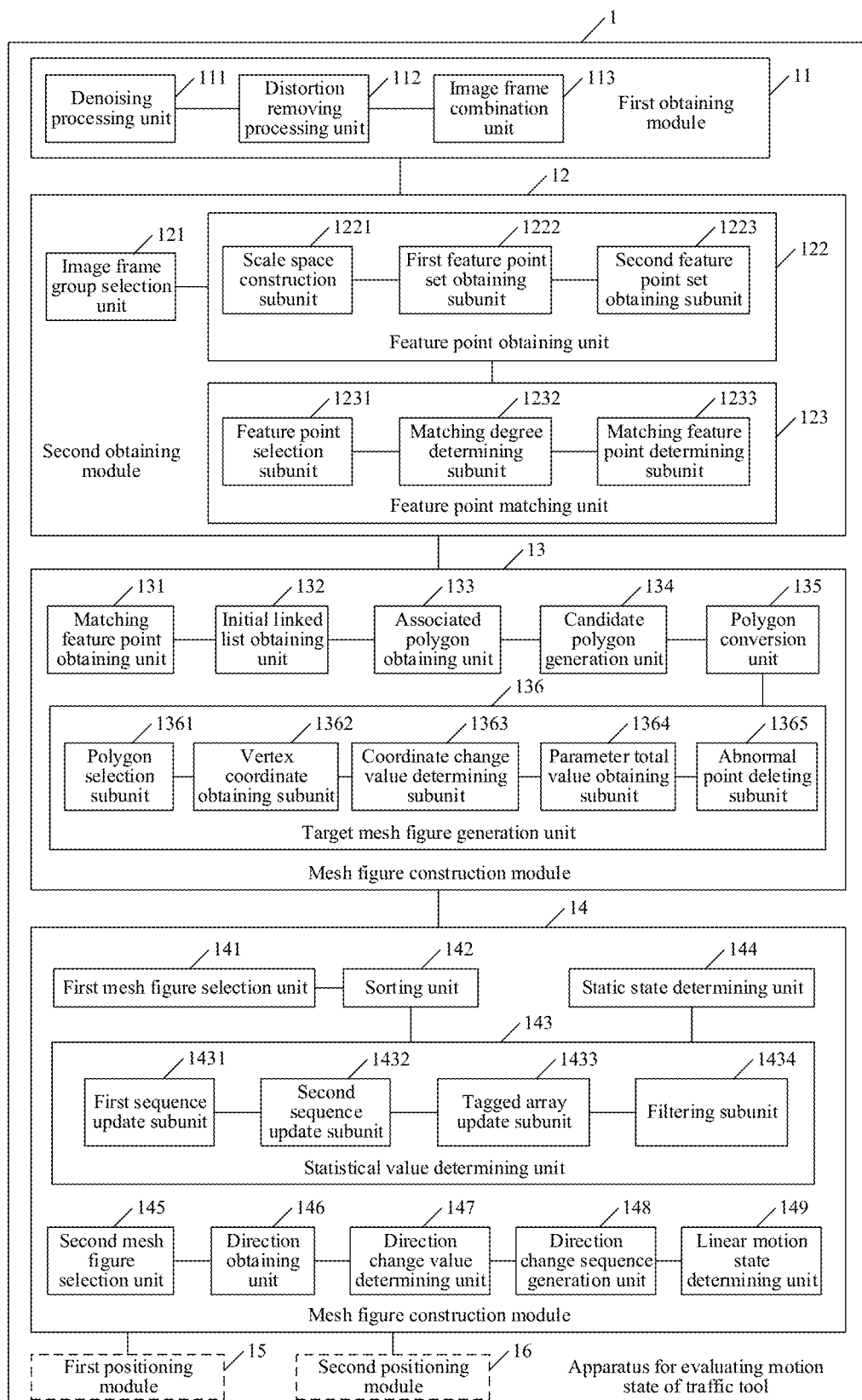
FIG. 15 is a schematic structural diagram of an apparatus for evaluating a motion state of a vehicle according to an embodiment of this application.

Referring to FIG. 15, FIG. 15 is a schematic structural diagram of an apparatus for evaluating a motion state of a vehicle according to an embodiment of this application. As shown in FIG. 15, the apparatus 1 for evaluating a motion state of a vehicle may include: a first obtaining module 11, a second obtaining module 12, a mesh figure construction module 13, and a motion state determining module 14, where the first obtaining module 11 is configured to obtain target image data captured by cameras on the vehicle, and combining every two neighboring image frames in the target image data into N image frame groups, N being a positive integer;

the second obtaining module 12 is configured to obtain matching feature points between two image frames included in each image frame group in the N image frame groups;

the mesh figure construction module 13 is configured to construct target mesh plane figures respectively corresponding to the N image frame groups according to the matching feature points in each image frame group; and the motion state determining module 14 is configured to determine the motion state of the vehicle according to the target mesh plane figures respectively corresponding to the N image frame groups.

For specific function implementations of the first obtaining module 11, the second obtaining module 12, the mesh figure construction module 13, and the motion state determining module 14, reference may be made to step S101 to step S104 in the embodiment corresponding to FIG. 3, and details are not described herein again.

In some feasible implementations, the first obtaining module 11 may include a denoising processing unit 111, a distortion removing processing unit 112, and an image frame combination unit 113, where the denoising processing unit 111 is configured to obtain original image data acquired by a camera for the vehicle, and perform denoising processing on the original image data to obtain denoised image data;

the distortion removing processing unit 112 is configured to perform distortion removing processing on the denoised image data according to a device parameter corresponding to the camera, to obtain the target image data associated with the vehicle; and the image frame combination unit 113 is configured to divide the target image data into N+1 image frames, and combine every two neighboring image frames in the N+1 image frames to obtain the N image frame groups.

For specific function implementations of the denoising processing unit 111, the distortion removing processing unit 112, and the image frame combination unit 113, reference may be made to step S202 in the embodiment corresponding to FIG. 6, and details are not described herein again.

In some feasible implementations, the second obtaining module 12 may include an image frame group selection unit 121, a feature point obtaining unit 122, and a feature point matching unit 123, where the image frame group selection unit 121 is configured to obtain an image frame group $G_i$ in the N image frame groups, where the image frame group $G_i$ includes an image frame $T_i$ and an image frame $T_{i+1}$, i is a positive integer less than or equal to N;

the feature point obtaining unit 122 is configured to obtain a first feature point set in the image frame $T_i$ and a second feature point set in the image frame $T_{i+1}$; and the feature point matching unit 123 is configured to perform feature point matching on the first feature point set and the second feature point set to obtain matching feature points between the image frame $T_i$ and the image frame $T_{i+1}$.

For specific function implementations of the image frame group selection unit 121, the feature point obtaining unit 122, and the feature point matching unit 123, reference may be made to step S102 in the embodiment corresponding to FIG. 3, and details are not described herein again.

In some feasible implementations, the feature point obtaining unit 122 may include a scale space construction subunit 1221, a first feature point set obtaining subunit 1222, and a second feature point set obtaining subunit 1223, where the scale space construction subunit 1221 is configured to construct a scale space for the image frame $T_i$ and the image frame $T_{i+1}$, search for a first key point position set corresponding to the image frame $T_i$ in the scale space, and search for a second key point position set corresponding to the image frame $T_{i+1}$ in the scale space;

the first feature point set obtaining subunit 1222 is configured to determine, according to a local gradient corresponding to a first key point position included in the first key point position set, a first descriptive feature corresponding to the first key point position, and obtain the first feature point set of the image frame $T_i$ according to the first key point position and the first descriptive feature; and the second feature point set obtaining subunit 1223 is configured to determine, according to a local gradient corresponding to a second key point position included in the second key point position set, a second descriptive feature corresponding to the second key point position, and obtain the second feature point set of the image frame $T_{i+1}$ according to the second key point position and the second descriptive feature.

For specific function implementations of the scale space construction subunit 1221, the first feature point set obtaining subunit 1222, and the second feature point set obtaining subunit 1223, reference may be made to step S102 in the embodiment corresponding to FIG. 3, and details are not described herein again.

In some feasible implementations, the feature point matching unit 123 may include a feature point selection subunit 1231, a matching degree determining subunit 1232, and a matching feature point determining subunit 1233, where:

the feature point selection subunit 1231 is configured to obtain a first feature point $a_t$ from the first feature point set, and obtain a second feature point $b_k$ from the second feature point set, where t is a positive integer less than or equal to the number of feature points included in the first feature point set, and k is a positive integer less than or equal to the number of feature points included in the second feature point set;

the matching degree determining subunit 1232 is configured to determine a matching degree between the first feature point $a_t$ and the second feature point $b_k$ according to a first descriptive feature corresponding to the first feature point $a_t$ and a second descriptive feature corresponding to the second feature point $b_k$; and the matching feature point determining subunit 1233 is configured to determine, when the matching degree is greater than a matching threshold, the first feature point $a_t$ and the second feature point $b_k$ as the matching feature points between the image frame $T_i$ and the image frame $T_{i+1}$.

For specific function implementations of the feature point selection subunit 1231, the matching degree determining subunit 1232, and the matching feature point determining subunit 1233, reference may be made to step S102 in the embodiment corresponding to FIG. 3, and details are not described herein again.

In some feasible implementations, the mesh figure construction module 13 may include a matching feature point obtaining unit 131, an initial linked list obtaining unit 132, an associated polygon obtaining unit 133, a candidate polygon generation unit 134, a polygon conversion unit 135, and a target mesh figure generation unit 136, where the matching feature point obtaining unit 131 is configured to obtain q matching feature points between an image frame $T_i$ and an image frame $T_{i+1}$ included in an image frame group $G_i$, and determine matching coordinate information respectively corresponding to the q matching feature points according to image coordinate information of each matching feature point in the q matching feature points in the image frame $T_i$ and the image frame $T_{i+1}$ respectively, where the image frame group $G_i$ belongs to the N image frame groups, i is a positive integer less than or equal to N, and q is a positive integer;

the initial linked list obtaining unit 132 is configured to obtain an initial polygon linked list associated with the q matching feature points according to the matching coordinate information respectively corresponding to the q matching feature points;

the associated polygon obtaining unit 133 is configured to obtain, for a matching feature point $c_r$ in the q matching feature points, an associated polygon matching the matching feature point $c_r$ from the initial polygon linked list, where a circumscribed circle of the associated polygon includes the matching feature point $c_r$, and r is a positive integer less than or equal to q;

the candidate polygon generation unit 134 is configured to delete a common side of the associated polygon, and connect the matching feature point $c_r$ to vertexes of the associated polygon to generate a candidate polygon corresponding to the matching feature point $c_r$;

the polygon conversion unit 135 is configured to convert the candidate polygon into a target polygon corresponding to the matching feature point $c_r$, and add the target polygon to the initial polygon linked list, where a circumscribed circle of the target polygon does not include any matching feature point; and the target mesh figure generation unit 136 is configured to determine the initial polygon linked list as a target polygon linked list when target polygons respectively corresponding to the q matching feature points are all added to the initial polygon linked list, and generate a target mesh plane figure corresponding to the image frame group $G_i$ according to the target polygon linked list.

For specific function implementations of the matching feature point obtaining unit 131, the initial linked list obtaining unit 132, the associated polygon obtaining unit 133, the candidate polygon generation unit 134, the polygon conversion unit 135, and the target mesh figure generation unit 136, reference may be made to step S205 in the embodiment corresponding to FIG. 6, and details are not described herein again.

In some feasible implementations, the target mesh figure generation unit 136 may include a polygon selection subunit 1361, a vertex coordinate obtaining subunit 1362, a coordinate change value determining subunit 1363, a parameter total value obtaining subunit 1364, and an abnormal point deleting subunit 1365, where the polygon selection subunit 1361 is configured to generate a candidate mesh plane figure corresponding to the image frame group $G_i$ according to the target polygon linked list, and obtain a polygon $D_j$ from the candidate mesh plane figure, where j is a positive integer less than or equal to the number of polygons included in the candidate mesh plane figure;

the vertex coordinate obtaining subunit 1362 is configured to obtain first vertex coordinates of matching feature points corresponding to the polygon $D_j$ in the image frame $T_i$, and obtain second vertex coordinates of the matching feature points corresponding to the polygon $D_j$ in the image frame $T_{i+1}$;

the coordinate change value determining subunit 1363 is configured to determine a coordinate change value corresponding to each side length included in the polygon $D_j$ according to the first vertex coordinates and the second vertex coordinates;

the parameter total value obtaining subunit 1364 is configured to determine a side length whose coordinate change value is less than a change threshold as a target side length, accumulate normal verification parameters corresponding to matching feature points on two ends of the target side length to obtain a total value of a normal verification parameter corresponding to each of the matching feature points of the polygon $D_j$; and the abnormal point deleting subunit 1365 is configured to determine a matching feature point whose total value of the normal verification parameter is greater than a parameter threshold as a normal matching feature point, and update the candidate mesh plane figure to the target mesh plane figure corresponding to the image frame group $G_i$ according to the normal matching feature point.

For specific function implementations of the polygon selection subunit 1361, the vertex coordinate obtaining subunit 1362, the coordinate change value determining subunit 1363, the parameter total value obtaining subunit 1364, and the abnormal point deleting subunit 1365, reference may be made to step S206 and step S207 in the embodiment corresponding to FIG. 6, and details are not described herein again.

In some feasible implementations, the motion state determining module 14 may include a first mesh figure selection unit 141, a sorting unit 142, a statistical value determining unit 143, and a static state determining unit 144, where the first mesh figure selection unit 141 is configured to obtain a target mesh plane figure $H_i$ corresponding to an image frame group $G_i$ in the N image frame groups, where the target mesh plane figure $H_i$ includes M connected but non-overlapping polygons, a circumscribed circle of each of the polygons does not include any matching feature point, M is a positive integer, and i is a positive integer less than or equal to N;

the sorting unit 142 is configured to obtain average coordinate change values respectively corresponding to the M polygons, sort the average coordinate change values respectively corresponding to the M polygons, and determine the sorted average coordinate change values as a first coordinate sequence of the target mesh plane figure $H_i$;

the statistical value determining unit 143 is configured to determine a statistical value associated with the target mesh plane figure $H_i$ according to the first coordinate sequence; and the static state determining unit 144 is configured to determine the motion state of the vehicle as a static state when statistical values respectively associated with N target mesh plane figures are all less than a first threshold.

For specific function implementations of the first mesh figure selection unit 141, the sorting unit 142, the statistical value determining unit 143, and the static state determining unit 144, reference may be made to the embodiment corresponding to FIG. 11, and details are not described herein again.

In some feasible implementations, the statistical value associated with the target mesh plane figure $H_i$ includes a coordinate average value, a coordinate median, and a coordinate standard deviation value; and the statistical value determining unit 143 may include a first sequence update subunit 1431, a second sequence update subunit 1432, a tagged array update subunit 1433, and a filtering subunit 1434, where the first sequence update subunit 1431 is configured to update the first coordinate sequence according to a median corresponding to the first coordinate sequence and the average coordinate change values included in the first coordinate sequence to obtain a second coordinate sequence;

the second sequence update subunit 1432 is configured to update the second coordinate sequence according to a lower quartile corresponding to the second coordinate sequence and an upper quartile corresponding to the second coordinate sequence to obtain a third coordinate sequence;

the tagged array update subunit 1433 is configured to obtain an initial tagged array corresponding to the first coordinate sequence, and update the initial tagged array according to a lower quartile corresponding to the first coordinate sequence, an upper quartile corresponding to the first coordinate sequence, and a median corresponding to the third coordinate sequence to obtain a target tagged array; and the filtering subunit 1434 is configured to filter the average coordinate change values included in the first coordinate sequence according to a non-zero element in the target tagged array to update the first coordinate sequence to a fourth coordinate sequence, and obtain a coordinate average value, a coordinate median, and a coordinate standard deviation value corresponding to the fourth coordinate sequence.

The second sequence update subunit 1432 is specifically configured to:

determine an effective value range of element values included in the second coordinate sequence according to the lower quartile corresponding to the second coordinate sequence and the upper quartile corresponding to the second coordinate sequence; and determine element values within the effective value range in the second coordinate sequence as the third coordinate sequence.

For specific function implementations of the first sequence update subunit 1431, the second sequence update subunit 1432, the tagged array update subunit 1433, and the filtering subunit 1434, reference may be made to step S1203 to step S1222 in the embodiment corresponding to FIG. 12, and details are not described herein again.

In some feasible implementations, the motion state determining module 14 may include a second mesh figure selection unit 145, a direction obtaining unit 146, a direction change value determining unit 147, a direction change sequence generation unit 148, and a linear motion state determining unit 149, where the second mesh figure selection unit 145 is configured to obtain a target mesh plane figure $H_i$ corresponding to an image frame group $G_i$ in the N image frame groups, where the image frame group $G_i$ includes an image frame $T_i$ and an image frame $T_{i+1}$, the target mesh plane figure $H_i$ includes M connected but non-overlapping polygons, a circumscribed circle of each of the polygons does not include any matching feature point, M is a positive integer, and i is a positive integer less than or equal to N;

the direction obtaining unit 146 is configured to obtain a first direction of each side of the M polygons in the image frame $T_i$, and obtain a second direction of each side of the M polygons in the image frame $T_{i+1}$;

the direction change value determining unit 147 is configured to determine a direction change value corresponding to each side of the M polygons according to the first direction and the second direction;

the direction change sequence generation unit 148 is configured to generate a direction change sequence associated with the M polygons according to direction change values respectively corresponding to the M polygons, and determine a direction average value and a direction median associated with the target mesh plane figure $H_i$ according to the direction change sequence; and the linear motion state determining unit 149 is configured to determine the motion state of the vehicle as a linear motion state when direction average values respectively associated with N target mesh plane figures and direction medians respectively associated with the N target mesh plane figures are all less than a second threshold.

For specific function implementations of the second mesh figure selection unit 145, the direction obtaining unit 146, the direction change value determining unit 147, the direction change sequence generation unit 148, and the linear motion state determining unit 149, reference may be made to the embodiments corresponding to FIG. 13 and FIG. 14, and details are not described herein again.

In some feasible implementations, the apparatus 1 for evaluating a motion state of a vehicle may further include a first positioning module 15 and a second positioning module 16, where the first positioning module 15 is configured to determine positioning information of the vehicle according to a positioning and navigation system when the motion state of the vehicle is the static state; and the second positioning module 16 is configured to determine, when the motion state of the vehicle is the linear motion state, a motion direction of the vehicle according to the linear motion state, and determine the positioning information of the vehicle according to the motion direction and the positioning and navigation system.

For specific function implementations of the first positioning module 15 and the second positioning module 16, reference may be made to step S104 in the embodiment corresponding to FIG. 3, and details are not described herein again.

In the embodiments of this application, in-vehicle image data corresponding to a driving vehicle is obtained, matching feature points between two adjacent image frames are extracted, a target mesh plane figure corresponding to the two adjacent image frames is constructed by using the matching feature points between the two adjacent image frames, and abnormal matching feature points are removed based on the target mesh plane figure. Therefore, the effectiveness of the matching feature points may be improved, and determining the motion state of the vehicle based on the target mesh plane figure may not only improve the evaluation accuracy of the motion state of the vehicle, but may also simplify the evaluation procedure of the motion state of the vehicle, thereby further improving the evaluation efficiency of the motion state of the vehicle. The motion state of the vehicle is evaluated based on the in-vehicle image data and the target mesh plane figure, so that limitations to a scenario in which the vehicle is located may be reduced, thereby effectively improving the evaluation accuracy of the motion state of the vehicle in a complex scenario (such as city overpass) and further improving the applicability of the method for evaluating a motion state of a vehicle. The motion state of the vehicle may effectively assist the positioning and navigation system, and may further improve the positioning precision of a terminal configured for the vehicle.

Figure 16:
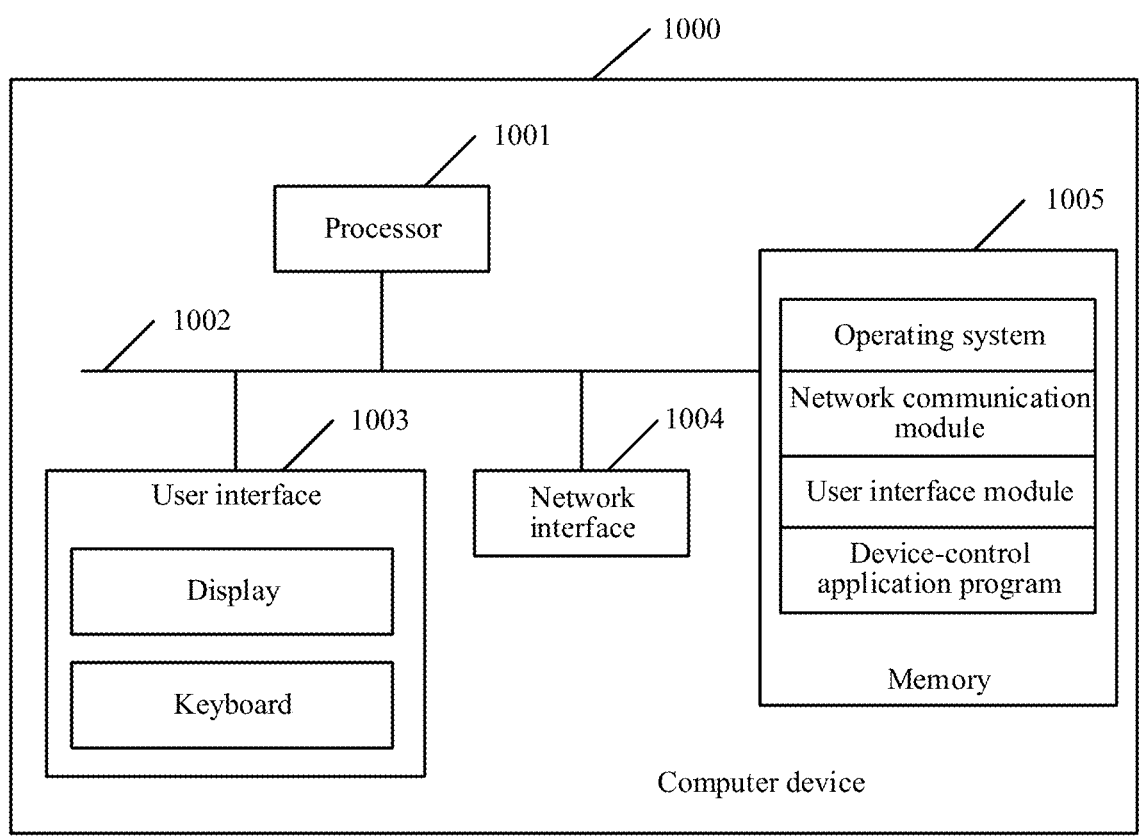
FIG. 16 is a schematic structural diagram of a computer device according to an embodiment of this application.

Referring to FIG. 16, FIG. 16 is a schematic structural diagram of a computer device according to an embodiment of this application. As shown in FIG. 16, the computer device 1000 may include: a processor 1001, a network interface 1004, and a memory 1005. In addition, the computer device 1000 may further include a user interface 1003 and at least one communication bus 1002. The communication bus 1002 is configured to implement connection and communication between these components. The user interface 1003 may include a display and a keyboard. In some embodiments, the user interface 1003 may further include a standard wired interface and a wireless interface. In some embodiments, the network interface 1004 may include a standard wired interface and a standard wireless interface (such as a Wi-Fi interface). The memory 1005 may be a high-speed RAM, or may be a non-volatile memory, for example, at least one magnetic disk memory. In some embodiments, the memory 1005 may also be at least one storage apparatus located away from the processor 1001. As shown in FIG. 16, the memory 1005 used as a computer-readable storage medium may include an operating system, a network communication module, a user interface module, and a device-control application program.

In the computer device 1000 shown in FIG. 16, the network interface 1004 may provide a network communication function, the user interface 1003 is mainly configured to provide an input interface for a user, and the processor 1001 may be configured to invoke the device-control application program stored in the memory 1005 to perform the following operations:

obtaining target image data captured by cameras on the vehicle, and combining every two neighboring image frames in the target image data into N image frame groups, N being a positive integer;

obtaining matching feature points between two image frames included in each image frame group in the N image frame groups;

constructing target mesh plane figures respectively corresponding to the N image frame groups according to the matching feature points in each image frame group; and determining the motion state of the vehicle according to the target mesh plane figures respectively corresponding to the N image frame groups.

It is to be understood that, the computer device 1000 described in this embodiment of this application may implement the description of the method for evaluating a motion state of a vehicle in the embodiment corresponding to any one of FIG. 3, FIG. 6, or FIG. 10 to FIG. 14, or the description of the apparatus 1 for evaluating a motion state of a vehicle in the embodiment corresponding to FIG. 15, and details are not described herein again. In addition, beneficial effects achieved by using the same method are not described herein again.

In addition, an embodiment of this application further provides a computer-readable storage medium. The computer-readable storage medium stores a computer program executed by the apparatus 1 for evaluating a motion state of a vehicle mentioned above, and the computer program includes program instructions. When executing the program instructions, a processor can implement the description of the method for evaluating a motion state of a vehicle in the embodiment corresponding to any one of FIG. 3, FIG. 6, or FIG. 10 to FIG. 14. Therefore, details are not described herein again. In addition, beneficial effects achieved by using the same method are not described herein again. For technical details that are not disclosed in the embodiments of the computer-readable storage medium of this application, reference may be made to the method embodiments of this application. In an example, the program instructions may be deployed to be executed on a computing device, or deployed to be executed on a plurality of computing devices at the same position, or deployed to be executed on a plurality of computing devices that are distributed in a plurality of positions and interconnected through a communication network, where the plurality of computing devices that are distributed in a plurality of positions and interconnected through a communication network may form a blockchain system.

In addition, an embodiment of this application further provides a computer program product or a computer program. The computer program product or the computer program may include computer instructions, and the computer instructions may be stored in a computer-readable storage medium. A processor of a computer device reads the computer instructions from the computer-readable storage medium, and executes the computer instructions, to cause the computer device to perform the description of the method for evaluating a motion state of a vehicle in the embodiment corresponding to any one of FIG. 3, FIG. 6, or FIG. 10 to FIG. 14. Therefore, details are not described herein again. In addition, beneficial effects achieved by using the same method are not described herein again. For technical details that are not disclosed in the embodiment of the computer program product or the computer program of this application, reference may be made to the description of the method embodiments of this application.

To make the description simple, the foregoing method embodiments are stated as a series of action combinations. However, a person skilled in the art is to know that this application is not limited to the described sequence of the actions because according to this application, some steps may use another sequence or may be simultaneously performed. In addition, a person skilled in the art is further to understand that the embodiments described in this specification are exemplary embodiments, and the involved actions and modules mentioned are not necessarily required by this application.

A sequence of the steps of the method in the embodiments of this application may be adjusted, and certain steps may also be combined or deleted according to an actual requirement.

The modules in the apparatus in the embodiments of this application may be combined, divided, and deleted according to an actual requirement.

A person of ordinary skill in the art may understand that all or some of the procedures of the methods in the foregoing embodiments may be implemented by a computer program instructing relevant hardware. The computer program may be stored in a computer-readable storage medium. When the program is executed, the procedures of the foregoing method embodiments may be performed. The foregoing storage medium may include a magnetic disc, an optical disc, a read-only memory (ROM), a random access memory (RAM), or the like.

The foregoing disclosure is merely exemplary embodiments of this application, and certainly is not intended to limit the protection scope of this application. Therefore, equivalent variations made in accordance with the claims of this application shall fall within the scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A method for evaluating a motion state of a vehicle, performed by a computer device and comprising:
    obtaining target image data captured by cameras on the vehicle, and combining every two neighboring image frames in the target image data into N image frame groups, N being a positive integer;
    obtaining matching feature points between two image frames comprised in each image frame group in the N image frame groups;
    constructing target mesh plane figures respectively corresponding to the N image frame groups according to the matching feature points in each image frame group;
    determining the motion state of the vehicle according to the target mesh plane figures respectively corresponding to the N image frame groups, wherein the motion states comprise one of a static state, a non-static state, a linear motion state, and a non-linear motion state,
    determining the static state or the non-static state based on an average coordinate change value of each polygon in the target mesh plane figures; and
    determining the linear motion state or the non-linear motion state based on a direction change value corresponding to an edge of each polygon in the target mesh plane figures.

2. The method according to claim 1, wherein the obtaining the target image data captured by cameras on the vehicle, and combining every two neighboring image frames in the target image data into N image frame groups comprises:
    obtaining original image data captured by the cameras on the vehicle, and performing denoising processing on the original image data to obtain denoised image data;
    performing distortion removing processing on the denoised image data according to a device parameter corresponding to the cameras, to obtain the target image data corresponding to the vehicle; and
    dividing the target image data into N+1 image frames, and combining every two neighboring image frames in the N+1 image frames to obtain the N image frame groups.

3. The method according to claim 1, wherein the obtaining matching feature points between two image frames comprised in each image frame group in the N image frame groups comprises:
    obtaining an image frame group $G_i$ in the N image frame groups, wherein the image frame group $G_i$ comprises an image frame $T_i$ and an image frame $T_{i+1}$, and i is a positive integer less than or equal to N;
    obtaining a first feature point set in the image frame $T_i$ and a second feature point set in the image frame $T_{i+1}$; and
    performing feature point matching on the first feature point set and the second feature point set to obtain matching feature points between the image frame $T_i$ and the image frame $T_i+1$.

4. The method according to claim 1, wherein the constructing target mesh plane figures respectively corresponding to the N image frame groups according to the matching feature points in each image frame group comprises:
    obtaining q matching feature points between an image frame $T_i$ and an image frame $T_{i+1}$ comprised in an image frame group $G_i$, and determining matching coordinate information respectively corresponding to the q matching feature points according to image coordinate information of the q matching feature points in the image frame $T_i$ and the image frame $T_{i+1}$ respectively, wherein the image frame group $G_i$ belongs to the N image frame groups, i is a positive integer less than or equal to N, and q is a positive integer;
    obtaining an initial polygon linked list associated with the q matching feature points according to the matching coordinate information respectively corresponding to the q matching feature points;
    obtaining, for a matching feature point $c_r$ in the q matching feature points, an associated polygon matching the matching feature point $c_r$ from the initial polygon linked list, wherein a circumscribed circle of the associated polygon comprises the matching feature point $c_r$, and r is a positive integer less than or equal to q;
    deleting a common side of the associated polygon, and connecting the matching feature point $c_r$ to vertexes of the associated polygon to generate a candidate polygon corresponding to the matching feature point $c_r$;
    converting the candidate polygon into a target polygon corresponding to the matching feature point $c_r$, and adding the target polygon to the initial polygon linked list, wherein a circumscribed circle of the target polygon does not comprise any matching feature point; and
    determining the initial polygon linked list as a target polygon linked list when target polygons respectively corresponding to the q matching feature points are all added to the initial polygon linked list, and generating a target mesh plane figure corresponding to the image frame group $G_i$ according to the target polygon linked list.

5. The method according to claim 1, wherein the determining the motion state of the vehicle according to the target mesh plane figures respectively corresponding to the N image frame groups comprises:
    obtaining a target mesh plane figure $H_i$ corresponding to an image frame group $G_i$ in the N image frame groups, wherein the target mesh plane figure $H_i$ comprises M connected but non-overlapping polygons, a circumscribed circle of each of the polygons does not comprise any matching feature point, M is a positive integer, and i is a positive integer less than or equal to N;

obtaining average coordinate change values respectively corresponding to the M polygons, sorting the average coordinate change values respectively corresponding to the M polygons, and determining the sorted average coordinate change values as a first coordinate sequence of the target mesh plane figure $H_i$;

determining a statistical value associated with the target mesh plane figure $H_i$ according to the first coordinate sequence; and determining the motion state of the vehicle as a static state when statistical values respectively associated with N target mesh plane figures are all less than a first threshold.

6. The method according to claim 1, wherein the determining the motion state of the vehicle according to the target mesh plane figures comprises:

obtaining a target mesh plane figure $H_i$ corresponding to an image frame group $G_i$ in the N image frame groups, wherein the image frame group $G_i$ comprises an image frame $T_i$ and an image frame $T_{i+1}$, the target mesh plane figure $H_i$ comprises M connected but non-overlapping polygons, a circumscribed circle of each of the polygons does not comprise any matching feature point, M is a positive integer, and i is a positive integer less than or equal to N;

obtaining a first direction of each side of the M polygons in the image frame $T_i$, and obtaining a second direction of each side of the M polygons in the image frame $T_{i+1}$;

determining a direction change value corresponding to each side of the M polygons according to the first direction and the second direction;

generating a direction change sequence associated with the M polygons according to direction change values respectively corresponding to the M polygons, and determining a direction average value and a direction median associated with the target mesh plane figure $H_i$ according to the direction change sequence; and determining the motion state of the vehicle as a linear motion state when direction average values respectively associated with N target mesh plane figures and direction medians respectively associated with the N target mesh plane figures are all less than a second threshold.

7. The method according to claim 1, further comprising:

when the motion state of the vehicle is in a static state, determining positioning information of the vehicle according to a positioning and navigation system mounted on the vehicle; and when the motion state of the vehicle is in a linear motion state, determining a motion direction of the vehicle according to the linear motion state, and determining the positioning information of the vehicle according to the motion direction and the positioning and navigation system.

8. A computer device, comprising:

one or more processors; and memory storing instructions, when executed by the one or more processors, cause the computer device to:

obtain target image data captured by cameras on a vehicle, and combining every two neighboring image frames in the target image data into N image frame groups, N being a positive integer;

obtain matching feature points between two image frames comprised in each image frame group in the N image frame groups;

construct target mesh plane figures respectively corresponding to the N image frame groups according to the matching feature points in each image frame group;

determine a motion state of the vehicle according to the target mesh plane figures respectively corresponding to the N image frame groups, wherein the motion states comprise one of a static state, a non-static state, a linear motion state, and a non-linear motion state, determine the static state or the non-static state based on an average coordinate change value of each polygon in the target mesh plane figures; and determine the linear motion state or the non-linear motion state based on a direction change value corresponding to an edge of each polygon in the target mesh plane figures.

9. The computer device according to claim 8, wherein the obtaining the target image data captured by cameras on the vehicle, and combining every two neighboring image frames in the target image data into N image frame groups comprises:

obtaining original image data captured by the cameras on the vehicle, and performing denoising processing on the original image data to obtain denoised image data;

performing distortion removing processing on the denoised image data according to a device parameter corresponding to the cameras, to obtain the target image data corresponding to the vehicle; and dividing the target image data into N+1 image frames, and combining every two neighboring image frames in the N+1 image frames to obtain the N image frame groups.

10. The computer device according to claim 8, wherein the obtaining matching feature points between two image frames comprised in each image frame group in the N image frame groups comprises:

obtaining an image frame group $G_i$ in the N image frame groups, wherein the image frame group $G_i$ comprises an image frame $T_i$ and an image frame $T_{i+1}$, and i is a positive integer less than or equal to N;

obtaining a first feature point set in the image frame $T_i$ and a second feature point set in the image frame $T_{i+1}$; and performing feature point matching on the first feature point set and the second feature point set to obtain matching feature points between the image frame $T_i$ and the image frame $T_i+1$.

11. The computer device according to claim 8, wherein the constructing target mesh plane figures respectively corresponding to the N image frame groups according to the matching feature points in each image frame group comprises:

obtaining q matching feature points between an image frame $T_i$ and an image frame $T_{i+1}$ comprised in an image frame group $G_i$, and determining matching coordinate information respectively corresponding to the q matching feature points according to image coordinate information of the q matching feature points in the image frame $T_i$ and the image frame $T_{i+1}$ respectively, wherein the image frame group $G_i$ belongs to the N image frame groups, i is a positive integer less than or equal to N, and q is a positive integer;

obtaining an initial polygon linked list associated with the q matching feature points according to the matching coordinate information respectively corresponding to the q matching feature points;

obtaining, for a matching feature point $c_r$ in the q matching feature points, an associated polygon matching the matching feature point $c_r$ from the initial polygon linked list, wherein a circumscribed circle of the associated polygon comprises the matching feature point $c_r$, and r is a positive integer less than or equal to q;

deleting a common side of the associated polygon, and connecting the matching feature point $c_r$ to vertexes of the associated polygon to generate a candidate polygon corresponding to the matching feature point $c_r$;

converting the candidate polygon into a target polygon corresponding to the matching feature point $c_r$, and adding the target polygon to the initial polygon linked list, wherein a circumscribed circle of the target polygon does not comprise any matching feature point; and determining the initial polygon linked list as a target polygon linked list when target polygons respectively corresponding to the q matching feature points are all added to the initial polygon linked list, and generating a target mesh plane figure corresponding to the image frame group $G_i$ according to the target polygon linked list.

12. The computer device according to claim 8, wherein the determining the motion state of the vehicle according to the target mesh plane figures respectively corresponding to the N image frame groups comprises:

obtaining a target mesh plane figure $H_i$ corresponding to an image frame group $G_i$ in the N image frame groups, wherein the target mesh plane figure $H_i$ comprises M connected but non-overlapping polygons, a circumscribed circle of each of the polygons does not comprise any matching feature point, M is a positive integer, and i is a positive integer less than or equal to N;

obtaining average coordinate change values respectively corresponding to the M polygons, sorting the average coordinate change values respectively corresponding to the M polygons, and determining the sorted average coordinate change values as a first coordinate sequence of the target mesh plane figure $H_i$;

determining a statistical value associated with the target mesh plane figure $H_i$ according to the first coordinate sequence; and determining the motion state of the vehicle as a static state when statistical values respectively associated with N target mesh plane figures are all less than a first threshold.

13. The computer device according to claim 8, wherein the determining the motion state of the vehicle according to the target mesh plane figures comprises:

obtaining a target mesh plane figure $H_i$ corresponding to an image frame group $G_i$ in the N image frame groups, wherein the image frame group $G_i$ comprises an image frame $T_i$ and an image frame $T_{i+1}$, the target mesh plane figure $H_i$ comprises M connected but non-overlapping polygons, a circumscribed circle of each of the polygons does not comprise any matching feature point, M is a positive integer, and i is a positive integer less than or equal to N;

obtaining a first direction of each side of the M polygons in the image frame $T_i$, and obtaining a second direction of each side of the M polygons in the image frame $T_{i+1}$;

determining a direction change value corresponding to each side of the M polygons according to the first direction and the second direction;

generating a direction change sequence associated with the M polygons according to direction change values respectively corresponding to the M polygons, and determining a direction average value and a direction median associated with the target mesh plane figure $H_i$ according to the direction change sequence; and determining the motion state of the vehicle as a linear motion state when direction average values respectively associated with N target mesh plane figures and direction medians respectively associated with the N target mesh plane figures are all less than a second threshold.

14. The computer device according to claim 8, wherein the instructions, when executed by the one or more processors, cause the computer device to:

when the motion state of the vehicle is in a static state, determine positioning information of the vehicle according to a positioning and navigation system mounted on the vehicle; and when the motion state of the vehicle is in a linear motion state, determine a motion direction of the vehicle according to the linear motion state, and determining the positioning information of the vehicle according to the motion direction and the positioning and navigation system.

15. A non-transitory computer-readable storage medium storing instructions, when executed, cause:

obtaining target image data captured by cameras on a vehicle, and combining every two neighboring image frames in the target image data into N image frame groups, N being a positive integer;

obtaining matching feature points between two image frames comprised in each image frame group in the N image frame groups;

constructing target mesh plane figures respectively corresponding to the N image frame groups according to the matching feature points in each image frame group;

determining a motion state of the vehicle according to the target mesh plane figures respectively corresponding to the N image frame groups, wherein the motion states comprise one of a static state, a non-static state, a linear motion state, and a non-linear motion state, determining the static state or the non-static state based on an average coordinate change value of each polygon in the target mesh plane figures; and determining the linear motion state or the non-linear motion state based on a direction change value corresponding to an edge of each polygon in the target mesh plane figures.

16. The non-transitory computer-readable storage medium according to claim 15, wherein the obtaining the target image data captured by cameras on the vehicle, and combining every two neighboring image frames in the target image data into N image frame groups comprises:

obtaining original image data captured by the cameras on the vehicle, and performing denoising processing on the original image data to obtain denoised image data;

performing distortion removing processing on the denoised image data according to a device parameter corresponding to the cameras, to obtain the target image data corresponding to the vehicle; and dividing the target image data into N+1 image frames, and combining every two neighboring image frames in the N+1 image frames to obtain the N image frame groups.

17. The non-transitory computer-readable storage medium according to claim 15, wherein the obtaining matching feature points between two image frames comprised in each image frame group in the N image frame groups comprises:
  obtaining an image frame group $G_i$ in the N image frame groups, wherein the image frame group $G_i$ comprises an image frame $T_i$ and an image frame $T_{i+1}$, and i is a positive integer less than or equal to N;
  obtaining a first feature point set in the image frame $T_i$ and a second feature point set in the image frame $T_{i+1}$; and
  performing feature point matching on the first feature point set and the second feature point set to obtain matching feature points between the image frame $T_i$ and the image frame $T_i+1$.

18. The non-transitory computer-readable storage medium according to claim 15, wherein the determining the motion state of the vehicle according to the target mesh plane figures respectively corresponding to the N image frame groups comprises:
  obtaining a target mesh plane figure $H_i$ corresponding to an image frame group $G_i$ in the N image frame groups, wherein the target mesh plane figure $H_i$ comprises M connected but non-overlapping polygons, a circumscribed circle of each of the polygons does not comprise any matching feature point, M is a positive integer, and i is a positive integer less than or equal to N;
  obtaining average coordinate change values respectively corresponding to the M polygons, sorting the average coordinate change values respectively corresponding to the M polygons, and determining the sorted average coordinate change values as a first coordinate sequence of the target mesh plane figure $H_i$;
  determining a statistical value associated with the target mesh plane figure $H_i$ according to the first coordinate sequence; and
  determining the motion state of the vehicle as a static state when statistical values respectively associated with N target mesh plane figures are all less than a first threshold.

19. The non-transitory computer-readable storage medium according to claim 15, wherein the determining the motion state of the vehicle according to the target mesh plane figures comprises:
  obtaining a target mesh plane figure $H_i$ corresponding to an image frame group $G_i$ in the N image frame groups, wherein the image frame group $G_i$ comprises an image frame $T_i$ and an image frame $T_{i+1}$, the target mesh plane figure $H_i$ comprises M connected but non-overlapping polygons, a circumscribed circle of each of the polygons does not comprise any matching feature point, M is a positive integer, and i is a positive integer less than or equal to N;
  obtaining a first direction of each side of the M polygons in the image frame $T_i$, and obtaining a second direction of each side of the M polygons in the image frame $T_{i+1}$;
  determining a direction change value corresponding to each side of the M polygons according to the first direction and the second direction;
  generating a direction change sequence associated with the M polygons according to direction change values respectively corresponding to the M polygons, and determining a direction average value and a direction median associated with the target mesh plane figure $H_i$ according to the direction change sequence; and
  determining the motion state of the vehicle as a linear motion state when direction average values respectively associated with N target mesh plane figures and direction medians respectively associated with the N target mesh plane figures are all less than a second threshold.

20. The non-transitory computer-readable storage medium according to claim 15, wherein the instructions, when executed, further cause:
  when the motion state of the vehicle is in a static state, determining positioning information of the vehicle according to a positioning and navigation system mounted on the vehicle; and
  when the motion state of the vehicle is in a linear motion state, determining a motion direction of the vehicle according to the linear motion state, and determining the positioning information of the vehicle according to the motion direction and the positioning and navigation system.

* * * * *